US007103369B2

(12) United States Patent
Sato et al.

(10) Patent No.: US 7,103,369 B2

(45) Date of Patent: Sep. 5, 2006

(54) SYSTEM AND METHOD FOR OBTAINING CONTENT RELATING TO A PREDICTED LOCATION OF A TERMINAL APPARATUS

(75) Inventors: Junichi Sato, Machida (JP); Takao Yamaguchi, Kokubunji (JP); Tomoaki Itoh, Kawasaki (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/491,441

(22) PCT Filed: Oct. 16, 2002

(86) PCT No.: PCT/JP02/10729

§ 371 (c)(1), (2), (4) Date: Apr. 13, 2004

(87) PCT Pub. No.: WO03/033998

PCT Pub. Date: Apr. 24, 2003

(65) Prior Publication Data

US 2004/0253965 A1 Dec. 16, 2004

(30) Foreign Application Priority Data

Oct. 16, 2001 (JP) ............................ 2001-318672

(51) Int. Cl.
*H04Q 7/20* (2006.01)

(52) U.S. Cl. .............................. 455/456.3; 455/456.1; 455/414.2; 701/201; 340/995.24

(58) Field of Classification Search ............ 455/456.3, 455/456.1; 340/995.24; 701/201
See application file for complete search history.

(56) References Cited

U.S. PATENT DOCUMENTS 5,424,951 A * 6/1995 Nobe et al. ................. 701/200
5,874,986 A * 2/1999 Gibbon et al. .............. 725/134
6,040,800 A * 3/2000 Raith et al. ................. 342/387
6,064,880 A * 5/2000 Alanara ...................... 455/419
6,125,323 A * 9/2000 Nimura et al. .............. 701/207
6,144,318 A * 11/2000 Hayashi et al. ........ 340/995.19
6,385,622 B1 * 5/2002 Bouve et al. ............ 707/104.1
6,714,859 B1 * 3/2004 Jones ......................... 701/201
6,798,358 B1 * 9/2004 Joyce et al. ........... 340/995.24

(Continued)

FOREIGN PATENT DOCUMENTS

JP 8-190574 7/1996

(Continued)

OTHER PUBLICATIONS

English Language Abstract of JP 2001-108477.

(Continued)

*Primary Examiner*—George Eng
*Assistant Examiner*—Ariel Balaoing
(74) *Attorney, Agent, or Firm*—Greenblum & Bernstein, P.L.C.

(57) ABSTRACT

The present invention is to store a content list that stores at least one pair of content related to a position and the position in relation to the content, determine a content acquisition region to acquire the content based on a current position, select content in relation to a position associated with the determined content acquisition region from the content list, acquire part of the selected content in advance, determine whether remaining part of the selected content will be referred to based on a position subsequent to the part of the selected content being acquired, thereby determining whether or not to acquire the remaining part of the selected content, and when determining to acquire the remaining part of the selected content, acquire the remaining part of the selected content.

17 Claims, 22 Drawing Sheets

U.S. PATENT DOCUMENTS

2002/0031281 A1* 3/2002 Chiba et al. ................ 382/305
2002/0032520 A1* 3/2002 Katayama et al. .......... 701/208
2002/0164998 A1* 11/2002 Younis ....................... 455/456

FOREIGN PATENT DOCUMENTS

| | | |
|---|---|---|
| JP | 11-167695 | 6/1999 |
| JP | 2000-193473 | 7/2000 |
| JP | 2001-108477 | 4/2001 |
| JP | 2001-119761 | 4/2001 |
| JP | 2001-235335 | 8/2001 |
| WO | 97/06522 | 2/1997 |

OTHER PUBLICATIONS

English Language Abstract of JP 2001-235335.
English Language Abstract of JP 8-190574.
English Language Abstract of JP 11-167695.
English Language Abstract of JP 2001-119761.
English Language Abstract of JP 2000-193473.
English Language Abstract of WO 97/06522.
Sato et al., “A Caching Algorithm for Location-Aware Information Disseminated through Broadcast Media”; Information Processing Society of Japan, vol. 41, No. 9, pp. 2434-2444, Sep. 2000.

* cited by examiner

153

| ADDRESS (201) | POSITION (202) | SISE (203) | |
|---|---|---|---|
| http://www.sample1.com/index.html | N34.44.26.8 E135.34.22.6 | 473 | RECORD # 1 |
| http://www.sample2.org/index.html | N35.39.26.5 E139.45.17.9 | 1152 | RECORD # 2 |
| : | : | : | |

| ADDRESS (201) | POSITION (202) | SIZE (203) | |
|---|---|---|---|
| http://www.sample1.com/index.html | N34.44.26.8 E135.34.22.6 | 10439 | RECORD # 1 |
| http://www.sample2.org/index.html | N35.39.26.5 E139.45.17.9 | 5460 | RECORD # 2 |
| : | : | : | |

| 201 ADDRESS | 202 POSITION | 203 SIZE | |
|---|---|---|---|
| http://www.sample1.com/index.html | N34.44.26.8 E135.34.22.6 | 473 | RECORD # 1 |
| http://www.sample1.com/images/photo1.jpg | N34.44.26.8 E135.34.22.6 | 4755 | RECORD # 1 − 1 |
| http://www.sample1.com/images/photo2.jpg | N34.44.26.8 E135.34.22.6 | 5211 | RECORD # 1 − 2 |
| http://www.sample2.org/index.html | N35.39.26.5 E139.45.17.9 | 1152 | RECORD # 2 |
| http://www.sample2.org/image1.jpg | N35.39.26.5 E139.45.17.9 | 2153 | RECORD # 2 − 1 |
| http://www.sample2.org/image2.jpg | N35.39.26.5 E139.45.17.9 | 2155 | RECORD # 2 − 2 |
| : | : | : | |

FIG. 5

HEAD/info.mpg HTTP/1.1
Host: www.mei.co.jp

GET/info.mpg HTTP/1.1 479
Host:www.mei.co.jp 480
Ronge: bytes=0 – 949999 481

FIG.13

| 852 FILE NAME | 853 ADDRESS | 854 TYPE | 855 PRESENCE OR ABSENCE AND FILE | 856 REFERENCE TIME | 857 POSITION | 858 DELETION PRIORITY |
|---|---|---|---|---|---|---|
| foo.html | http://www..../foo.html | PREFETCH | — | Thu Jul 5 18:14:35 JST 2001 | N34.44.26.8 E135.34.22.6 | LOW |
| bar.mpg | http://www..../bar.mpg | FIRST HALF | bar — 2.mpg | Thu Jul 5 18:38:40 JST 2001 | N34.39.26.5 E139.45.17.9 | LOW |
| bar_2.mpg | http://www..../bar.mpg | LATTER HALF | bar.mpg | Thu Jul 5 18:38:40 JST 2001 | N34.39.26.5 E139.45.17.9 | HIGH |

SYSTEM AND METHOD FOR OBTAINING CONTENT RELATING TO A PREDICTED LOCATION OF A TERMINAL APPARATUS

TECHNICAL FIELD

The present invention relates to a mobile-unit terminal apparatus that acquires position-related content to present.

BACKGROUND ART

In recent years, with improvement of wireless communication networks including mobile telephone networks, service has become widespread that provides content to a terminal apparatus which is mounted and used on a mobile unit such as a car. It is preferable that the content to provide to the terminal apparatus mounted on a mobile unit is content related to positions through which the mobile unit passes.

The mobile unit and a provision source (for example, content server) of data (content data) that expresses the content are connected by communication paths including a wireless communication path. Data transmission rate is lower in the wireless communication path than in a wired communication path. Therefore, it is required to provide appropriate content at proper timing corresponding to the position to the terminal apparatus mounted on the mobile unit whose position changes with time.

As a conventional technique for providing content related to positions through which a mobile unit passes to the terminal apparatus, for example, the technique as disclosed in the following document is known.

Document: Sato, et al. “A Caching Algorithm for Location-aware Information Disseminated through Broadcast Media”, Information Processing Society of Japan, Vol.41, No.9, pages 2434 to 2444, September, 2000.

The conventional technique as disclosed in the document has a premise that a car (mobile unit) mounted with the terminal apparatus moves along a beforehand planned path. Then, the mobile unit acquires content data that expresses content via broadcast before presenting the information (content) related to a position on the moving path to a user, and stores the data in a cache of the terminal apparatus. Thus, it is intended to present the content at proper timing while apparently eliminating a waiting time for a user to access.

As described above, the conventional technique as disclosed in the document has the premise that the mobile unit mounted with the terminal apparatus moves along the beforehand planed path (scheduled path). Hence, the mobile unit acquires in advance content data that expresses the content related to a position near the scheduled path.

Therefore, according to the conventional technique, when the scheduled path is not set, the mobile unit cannot acquire the content data in advance.

Then, it is considered predicting a path of a mobile unit based on a current position of the mobile unit, and acquiring in advance content data that expresses the content related to a position near the predicted path. However, in this case, the mobile unit may move out of the predicted path. Therefore, the mobile unit has to acquire content data of wide range in advance. Accordingly, the mobile unit needs to store a number of items of content data that are not presented eventually, and as a result, cannot use the storage capacity of the terminal apparatus efficiently.

Further, in the above-mentioned document, a case is not considered where the time is long which is required for transmission from a content providing source to a terminal apparatus because the size is large of the content data that expresses the content. As in this case, when the time required for transmission of the content data is long, there is a possibility that the mobile unit has already passed through a position in relation to the content at the time transmission of the content data has been completed. In this case, it is not possible to present the acquired content data at appropriate timing, and the acquired content data becomes waste. As a result, the usage efficiency of the transmission path deteriorates.

DISCLOSURE OF INVENTION

It is an object of the present invention to provide a terminal apparatus for a mobile unit capable of acquiring content suitably, irrespective of whether or not a scheduled path is set, even when the size of content data is large.

A terminal apparatus in the present invention stores a content list that stores at least one pair of content related to a position and the position in relation to the content, determines a content acquisition region to acquire the content based on a current position, selects content having a position associated with the determined content acquisition region from the content list, acquires part of the selected content in advance, determines whether remaining part of the selected content will be referred to based on a position subsequent to acquisition of the part of the selected content, thereby determining whether or not to acquire the remaining part of the selected content, and when determining to acquire the remaining part of the selected content, acquires the remaining part of the selected content.

In this way, even when the size of the content data is large, it is possible to separately acquire the content in twice. As a result, it is possible to acquire part of the content prior to the remaining part to enable display thereof. In other words, even when the position largely changes due to the movement, it is possible to acquire suitable content corresponding to the position to present.

BRIEF DESCRIPTION OF DRAWINGS

FIG. 3 is a chart showing an example of a data structure of a content list according to the above embodiment;

FIG. 4 is a chart showing another example of the data structure of the content list according to the above embodiment;

FIG. 5 is a chart showing still another example of the data structure of the content list according to the above embodiment;

FIG. 12 is a view showing an example of a command to transmit when the terminal apparatus inquires about the size of the content data at the content server according to the above embodiment;

FIG. 13 is a view showing an example of a request to transmit to the content server when the terminal apparatus acquires the first half of the content data according to the above embodiment;

FIG. 26 is a view showing an example of a table to distinguish between types of data stored in the storage section to manage when three storage sections included in the storage section are implemented by a single storage apparatus according to the above embodiment.

BEST MODE FOR CARRYING OUT THE INVENTION

Figure 1:
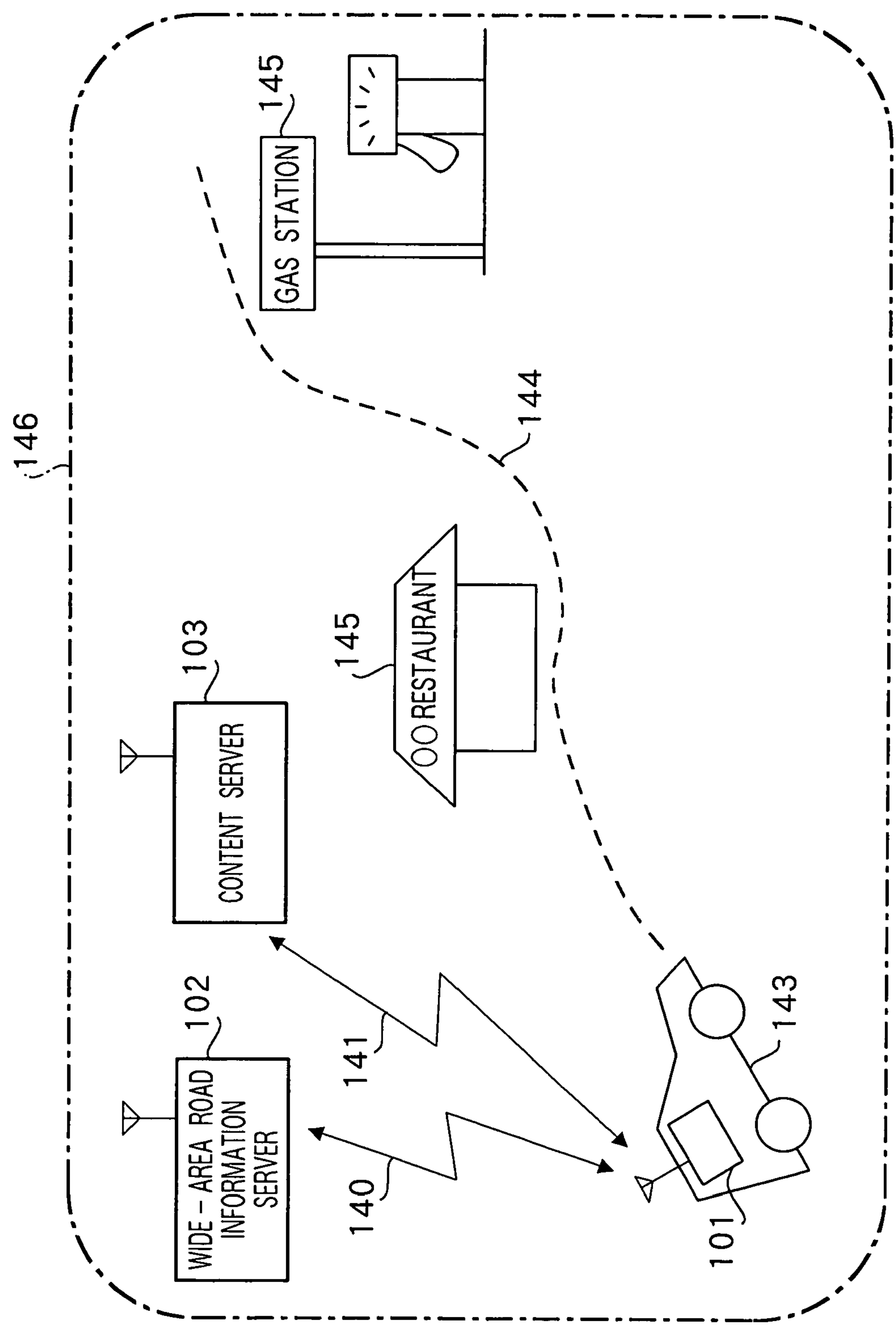
FIG. 1 is a view schematically showing a mode where a terminal apparatus is used according to one embodiment of the present invention.

An embodiment of the present invention will be described specifically below with reference to accompanying drawings. In addition, the same reference numerals denote the same structural components in following descriptions.

A mode where a terminal apparatus according to one embodiment of the present invention is used will be described first with reference to FIG. 1. FIG. 1 is a view schematically showing a mode where the terminal apparatus is used according to the one embodiment of the present invention.

Terminal apparatus 101 is mounted on mobile unit 143. Mobile unit 143 is a general mobile unit such as, for example, a car, motorbike, and bicycle. Mounting terminal apparatus 101 on mobile unit 143 means both mobile unit 143 is provided with terminal apparatus 101 and a user brings portable terminal apparatus 101 in mobile unit 143 to use therein.

In addition, when a user moves by walk while carrying terminal apparatus 101, the user is regarded as a mobile unit.

Terminal apparatus 101 is, for example, a car navigation system with communication function, PDA (Personal Data Assist), notebook personal computer or the like. Further, terminal apparatus 101 may be a portable communication terminal such as a cellular telephone and PHS.

Mobile unit 143 moves along path 144. Path 144 may be planned beforehand or not planned. Facilities 145 are present at positions near path 144.

FIG. 1 shows a restaurant and gas station as examples of facilities 145. As a matter of course, facilities 145 are not limited to the aforementioned examples. Facilities 145 may be shopping facilities, sightseeing facilities and soon, and are only required to have content desired to present to users (for example, a driver and/or passenger of mobile unit 143).

Mobile unit 143 moves inside predetermined region 146. For example, the region 146 is a nation, Kanto area, Kansai are, prefecture, city, town or village. Further, the region 146 may be a specific area determined independently of governmental classification. Furthermore, when path 144 is planned in advance, region 146 may be determined to a region around path 144.

Terminal apparatus 101 is connected to wide-area road information server 102 by wireless communication path 140. Terminal apparatus 101 is further connected to content server 103 by wireless communication path 141.

Wide-area road information server 102 and content server 103 are, for example, server computers with arbitrary configurations.

Wireless communication paths 140 and 141 are, for example, cellular telephone channel, PHS channel, wireless LAN channel, and DSRC.

In addition, DSRC stands for Dedicated Short Range Communications (local-area communications), and is a communication system currently used in the automatic toll collection system of toll road. DSRC is specifically described in "ITS Information Shower~All About DSRC system", DSRC System Laboratory, Create-Crews Co., Ltd.)

It is not indispensable that terminal apparatus 101 is directly connected to wide-area road information server 102 via wireless communication path 140. Any network (for example, internet) and/or wired communication path may be present between terminal apparatus 101 and wide-area road information server 102 in addition to wireless communication path 140. The same situation may exist between terminal apparatus 101 and content server 103.

Content server 103 transmits content data (see FIG. 2) to terminal apparatus 101. The content data expresses content related to positions of facilities 145. For example, such content may be advertising information of facilities 145. Content may be road information or sightseeing information that is not related to facilities 145. In other words, the content is in relation to a position (for example, position in which each of facilities 145 is present) inside predetermined region 146.

Terminal apparatus 101 receives the content data that expresses such content to display.

Figure 2:
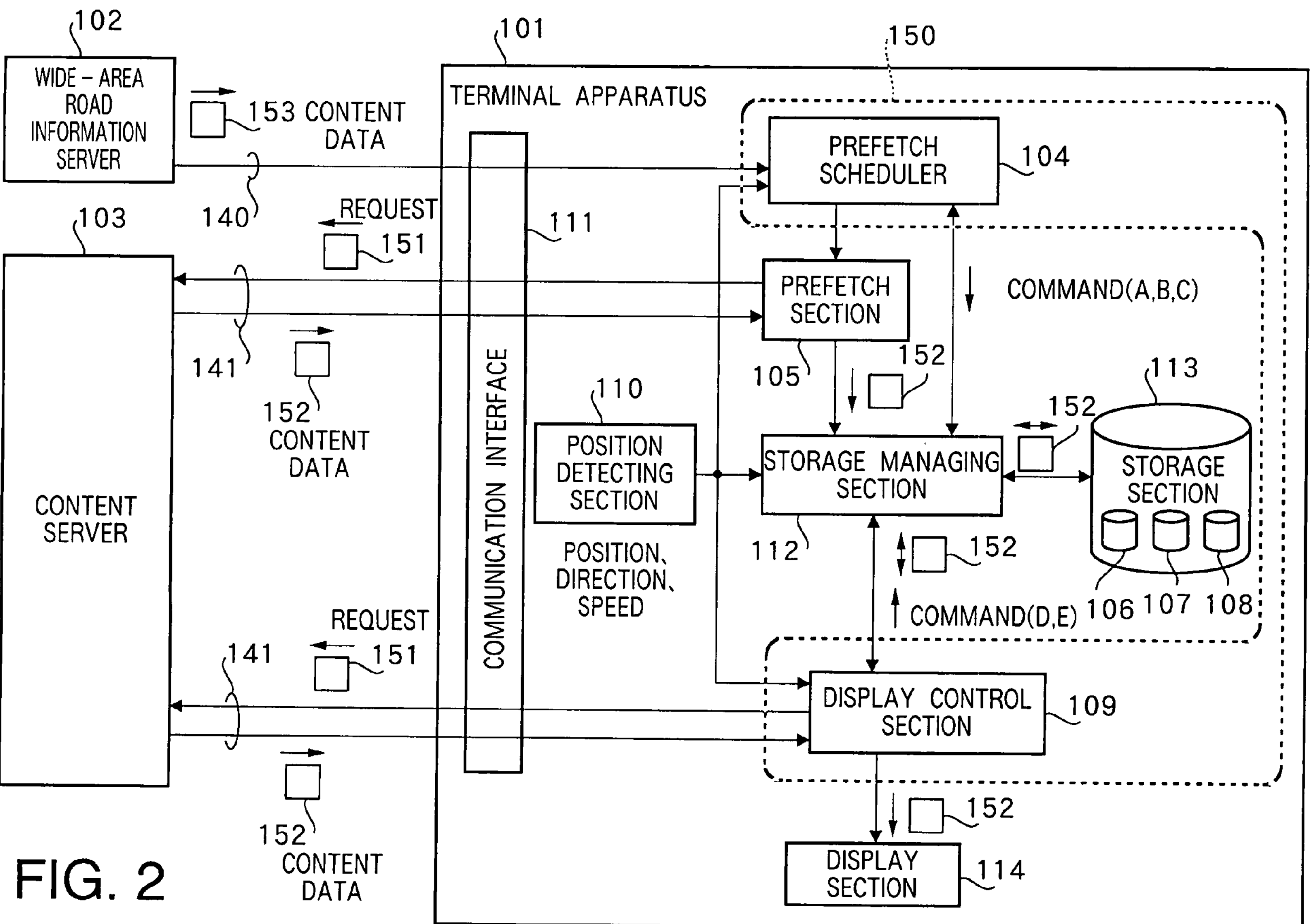
FIG. 2 is a block diagram illustrating a configuration of the terminal apparatus according to the above embodiment.

A configuration of a content distribution system including terminal apparatus 101 according to this embodiment will be described below with reference to FIG. 2. FIG. 2 illustrates a configuration of terminal apparatus 101.

Terminal apparatus 101 has a prefetch scheduler 104, prefetch section 105, display control section 109, position detecting section 110, communication interface 111, storage managing section 112, display section 114 and storage section 113.

Communication interface 111 communicates with wide-area road information server 102 via wireless communication path 140, and further communicates with content server 103 via wireless communication path 141.

Position detecting section 110 detects a position of mobile unit 143 (see FIG. 1). Position detecting section 110 further detects a direction in which mobile unit 143 moves, moving speed of the unit 143, etc.

Position detecting section 110 is, for example, a GPS (Global Positioning System) sensor. Further, position detecting section 110 may be any input device which presents a screen of a map to a user, detects a position designated by the user on the presented screen of the map, and obtains the detected position as a position of mobile unit 143. Position detecting section 110 may operate in conjunction with a car navigation system (not shown).

Prefetch scheduler 104 and display control section 109 function as determining section 150 that performs determination processing for controlling acquisition and display of content data 152 based on the position of mobile unit 143.

Prefetch scheduler 104 acquires content list 153 from wide-area road information server 102 via communication interface 111.

Display control section 109 acquires contend data 152 from content server 103 via communication interface 111.

Content list 153 is, for example, a table that associates a position inside region 146 (see FIG. 1) with an address of content data 152 that expresses content related to the position.

Prefetch section 105 acquires contend data 152 that expresses the content from content server 113 via communication interface 111. Based on content list 153, prefetch scheduler 104 controls the timing at which prefetch section 105 acquires content data 152.

Storage section 113 stores content data 152 acquired from content server 103. Storage section 113 includes prefetch storage section 106 that stores non-displayed content data 152 (the first half and latter half), displayed first-half storage section 107 that stores the displayed first half of content data 152, and displayed latter-half storage section 108 that stores the displayed latter half of content data 152.

Storage section 113 may be a hard disk, for example, or any memory.

Storage managing section 112 assigns a deletion priority for determining a priority of deleting data from storage 113 to the data (for example, content data 152) stored in storage section 113, and thus manages the data stored in storage section 113.

Display section 114 displays content data 152 stored in storage section 113. Based on content list 153, display control section 109 controls the timing at which display section 114 displays content data 152.

Further, display section 114 outputs audio as well as video. In other words, display section 114 is capable of responding to content data including audio, as well as video.

In addition, any presenting apparatus may substitute for display section 114. The presenting apparatus includes a printer.

Content list 153 stored in wide-area road information server 102 will be described below with reference to FIG. 3. FIG. 3 is a chart showing an example of a data structure of content list 153.

It is described in content list 153 that with respect to each content related to a position inside region 146 (FIG. 1), the position inside region 146 in relation to content, an address of content data 152 that expresses the content, and a size of content data 152 in association with one another.

A plurality of records is described in content list 153. Each of the records corresponds to an item of content data.

Specifically, in content list 153 are described “address” field 201, “position” field 202 and “size” field 203 for each record as shown in FIGS. 3.

“Address” field 201 stores an address of content data 152. The address of the content indicates, for example, a storage location of the content in content server 103 (FIG. 1). Otherwise, when a network such as the Internet exists between terminal apparatus 101 and content server 103, an address of content data 152 is an address for uniquely specifying a storage location of content data 152 on the network, for example, a URL address.

Content data 152 is described, for example, in HTML (Hyper Text Markup Language). HTML is a language of which specifications are determined by World Wide Web Consortium. World Wide Web Consortium is described in a web page of http://www.w3.org.

In the example as shown in FIG. 3, an address of a top page is described in “address” field 201. When content data 152 includes part of images or the like, prefetch scheduler 104 (see FIG. 2) acquires content list 153, and obtains an address of the part by analyzing the top page.

“Position” field 202 stores a position inside region 146 (see FIG. 1) to which is related the content expressed by content data 152.

In the example as shown in FIG. 3, the position inside region 146 is represented by the latitude and longitude. In addition, a mode for representing a position inside region 146 is not limited to the foregoing. Further, a position inside region 146 to which content is related is called a “content position” in this specification.

“Size” field 203 stores a size of content data 152. In the example as shown in FIG. 3, “size” field 203 stores the size of the top page.

Content list 153 is stored in storage section 113 (see FIG. 2), and receives access from prefetch scheduler 104 and display control section 109.

In this way, storage section 113 functions as a storage section for associating position 201 inside region 146 to which content is related with address 202 and size 203 of content data 152 that expresses the content.

Content list 153 is not limited to the example in FIG. 3. Another example of content list 153 will be described below with reference to FIG. 4. FIG. 4 is a chart showing another example of a data structure of content list 153.

Content list 153 as shown in FIG. 4 is different from content list 153 as shown in FIG. 3 in a value stored in "size" field 203.

"Size" field 203 of content list 153 as shown in FIG. 4 stores the total size of the size of the top page of content data 152 and the size of all parts contained in contend data 152.

In this case, only by referring to content list 153, prefetch scheduler 104 is capable of estimating the time required for acquiring content data 152.

Still another example of content list 153 will be described below with reference to FIG. 5. FIG. 5 is a chart further showing another example of the data structure of content list 153.

Respective addresses and sizes of parts contained in content data 152 are described in content list 153. Specifically, records #1-1, #1-2, #2-1 and #2-2 indicate information of the parts contained in content data 152.

In this case, only by referring to content list 153, prefetch scheduler 104 is capable of obtaining the respective addresses and sizes of parts contained in content data 152.

Figure 6:
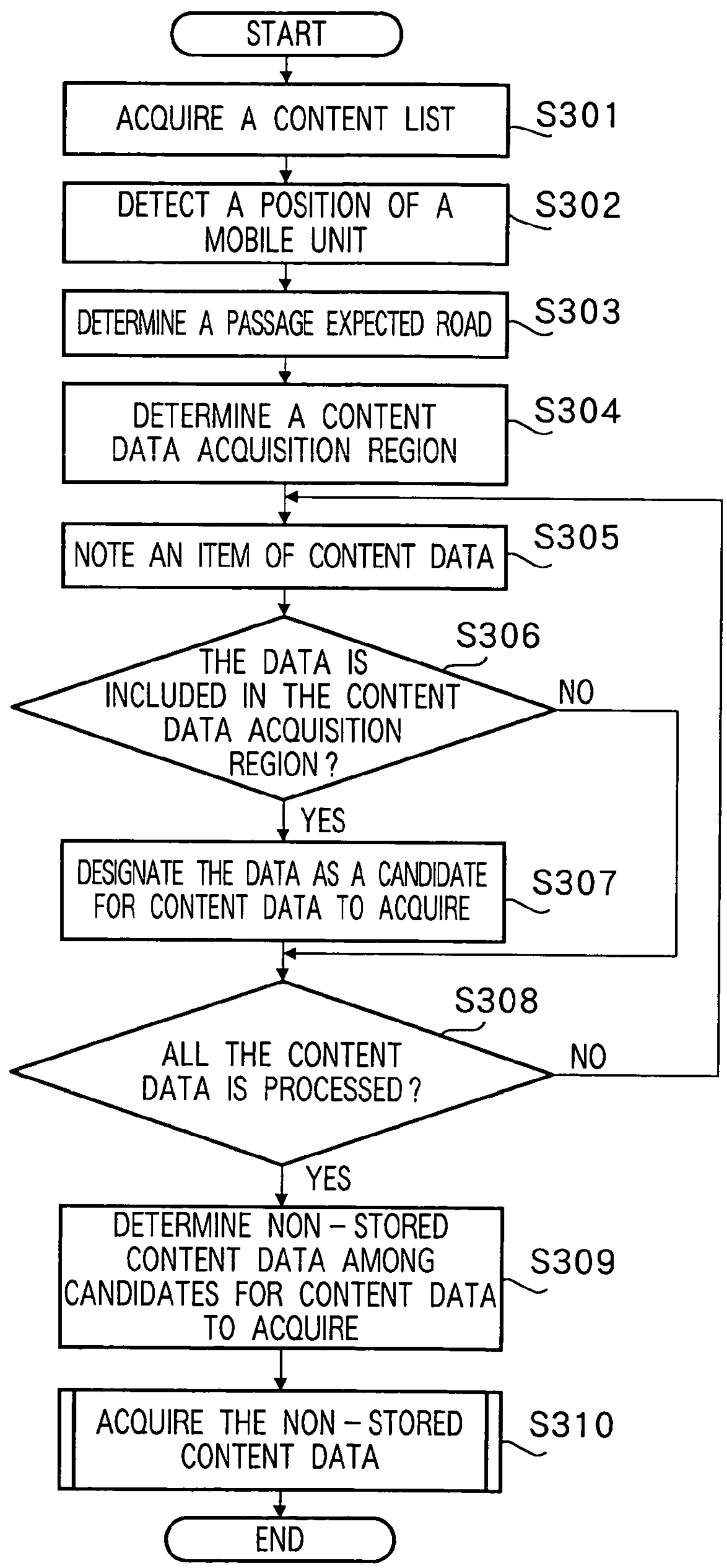
FIG. 6 is a flowchart illustrating control of timing for a prefetch scheduler to acquire content data according to the above embodiment.

Control of timing for terminal apparatus 101 to acquire content data 152 will be described below with reference to FIG. 6. FIG. 6 is a flowchart illustrating control of the timing for terminal apparatus 101 to acquire content data 152. The processing as illustrated in FIG. 6 is repeated at predetermined time intervals always during a period of time mobile unit 143 is moving. Otherwise, the processing as illustrated in FIG. 6 may be repeated whenever mobile unit 143 moves a predetermined distance.

First in terminal apparatus 101, pre-scheduler 104 acquires content list 153 (step S301). Prefetch scheduler 104 may acquire content list 153 on broadcast or on demand.

In the case where prefetch scheduler 104 acquires content list 153 on broadcast, wide-area road information server 102 (FIG. 2) broadcasts content list 153 so as to cover region 146. Prefetch scheduler 104 receives the broadcast and thereby acquires content list 153.

Meanwhile, in the case where prefetch scheduler 104 acquires content list 153 on demand, wide-area road information server 102 transmits content list 153 to terminal apparatus 101 in response to a request from prefetch scheduler 104. Then, prefetch scheduler 104 receives transmitted content list 153 and thereby acquires content list 153.

Prefetch scheduler 104 may acquire content list 153 from an arbitrary storage medium (for example, flexible disk). In this case, wide-area road information server 102 (FIG. 1) is not needed.

Further, it is only required to perform the processing of step S301 once at the time mobile unit 143 (FIG. 1) mounted with terminal apparatus 101 enters region 146 (or before the unit 143 enters region 146).

Next, prefetch scheduler 104 stores content list 153 acquired in step S301 in storage section 113 via storage managing section 112. Storage section 113 and display control section 109 access stored content list 153.

In terminal apparatus 101, position detecting section 110 detects a position of mobile unit 143 (step S302).

In terminal apparatus 101, prefetch scheduler 104 determines a passage expected road based on the position of mobile unit 143 detected in step S302 (step S303).

The passage expected road is a road predicted for mobile unit 143 to be going to pass. The passage expected road is determined by referring to a road map. Terminal apparatus 101 may acquire a road map from wide-area road information server 102 together with content list 153, or may read road map data stored in a storage medium to acquire.

In addition, when path 144 (FIG. 1) of mobile unit 143 is already planned, terminal apparatus 1101 determines beforehand planned path 144 as a passage expected road.

In terminal apparatus 101, prefetch scheduler 104 determines an acquisition region to acquire content data 152 (step S304).

Prefetch scheduler 104 determines the content data acquisition region based on the position of mobile unit 143 detected in step S302. Further, the content data acquisition region may be determined in consideration of the passage expected road determined in step S303.

In addition, the content data acquisition region will be described later with reference to FIGS. 7 to 10.

In terminal apparatus 101, prefetch scheduler 104 notes an item of content data 152 (record) among content list 153 (step S305).

In terminal apparatus 101, prefetch scheduler 104 determines whether the position (content position) to which is related the content data 152 noted in step S305 is included in the content data acquisition region determined in step S304 (step S306).

When a result of the determination in step S306 is "Yes", terminal apparatus 101 proceeds to processing of S307. Meanwhile, when a result of the determination in step S306 is "No", terminal apparatus 101 proceeds to processing of step S308.

In step 307, prefetch scheduler 104 in terminal apparatus 101 designates the noted content data 152 as a candidate for content data to acquire.

In terminal apparatus 101, prefetch scheduler 104 determines whether or not the processing of steps S305 to S307 is finished on all the content data of content list 153 (step S308).

When a result of the determination in step S308 is "Yes", prefetch scheduler 104 proceeds to processing of step S309. Meanwhile, when a result of the determination in step S308 is "No", prefetch scheduler 104 returns to the processing of step S305.

In this way, terminal apparatus 101 performs the processing of steps S305 to S307 on each record (content data) included in content list 153. Thus, terminal apparatus 101 selects the content associated with the content acquisition region from pieces of content included in content list 153, and determines the content as a candidate for content to acquire.

In terminal apparatus 101, prefetch scheduler 104 determines non-stored content data that is content data not stored in storage section 113 among candidates for content data to acquire designated in step S307 (step S309). Specifically, in the processing of S309, prefetch scheduler 104 issues a command (command A) to storage managing section 112, and storage managing section 112 receiving the command determines non-stored content data from the candidates for content data to acquire.

In addition, the processing that is performed when storage managing section 112 receives command A will be described later with reference to FIG. 14.

Prefetch section 105 in terminal apparatus 101 acquires non-stored content data from content server 103.

Specific processing procedures in step S310 will be described later with reference FIG. 11.

In this way, terminal apparatus 101 acquires content data 152.

Figure 7:
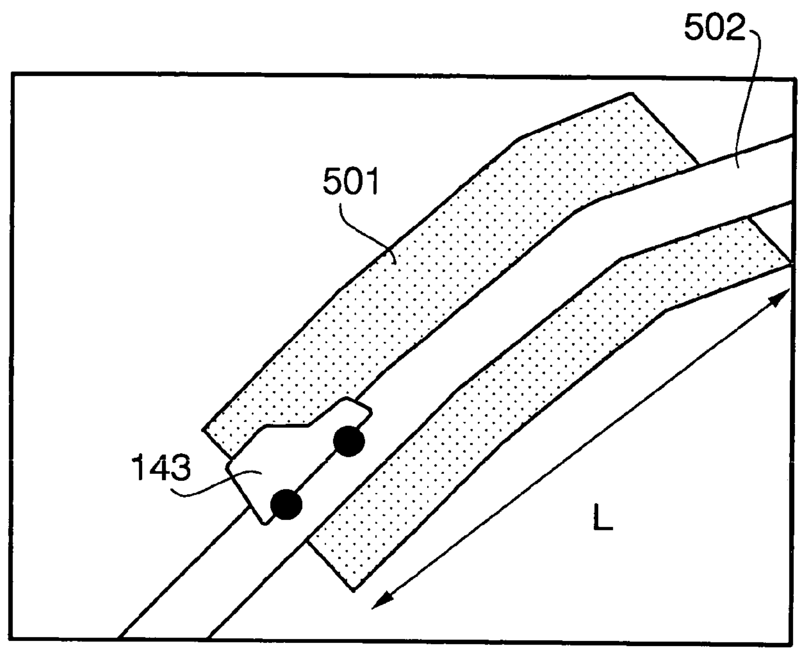
FIG. 7 is a view showing an example of a content data acquisition region according to the above embodiment.

Content data acquisition region 501 determined in the processing of step S304 as shown in FIG. 6 will be described next with reference to FIG. 7. FIG. 7 is a view showing an example of content acquisition region 501.

In FIG. 7, reference numeral "502" indicates a passage expected road determined in step S303 in FIG. 6.

Content data acquisition region 501 is determined as a region, along passage expected road 502, with a predetermined length L forward of mobile unit 143. The length L may be measured along passage expected road 502, or may be the direct distance between opposite ends of content data acquisition region 501.

In addition, terminal apparatus 101 is capable of recognizing which direction is forward of mobile unit 143 among directions along passage expected road 502 by the moving direction of mobile unit 143 detected in position detecting section 110. As a matter of course, when the information that passage expected road 502 is a one-way road is obtained from the road map, terminal apparatus 101 is capable of recognizing which direction is forward of mobile unit 143 from the one-way information.

Content data acquisition region 501 as shown in FIG. 7 is preferably adopted in the case where passage expected road 502 has few branching points such as an intersection and exit like an expressway or freeway.

Figure 8:
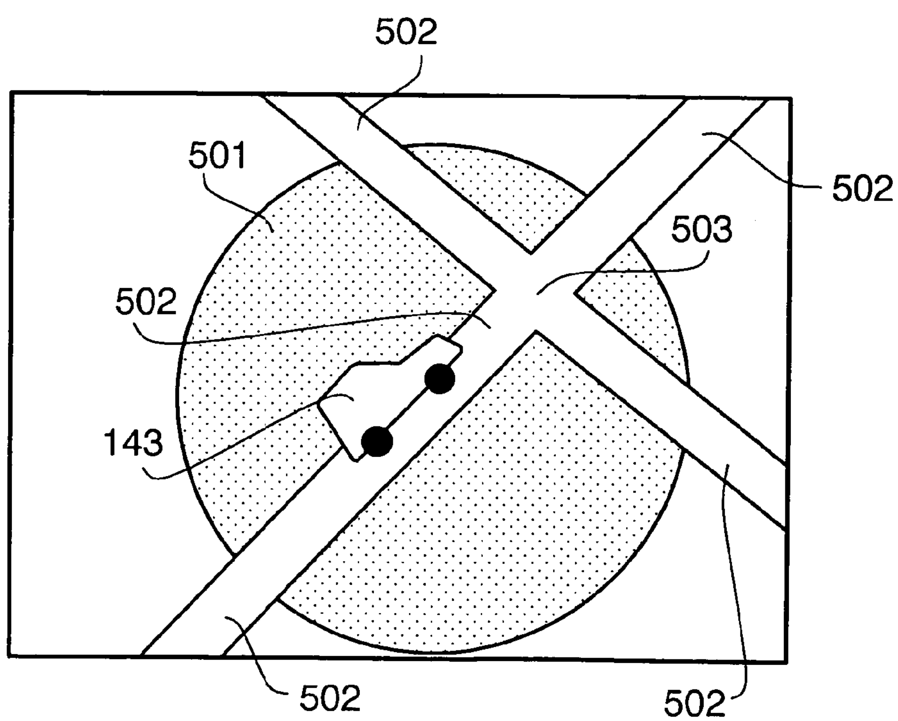
FIG. 8 is a view showing another example of the content data acquisition region according to the above embodiment.

Another example of content data acquisition region 501 will be described next with reference to FIG. 8. FIG. 8 is a view showing another example of content data acquisition region 501.

In the example as shown in FIG. 8, content data acquisition region 501 is determined as a region in the form of a circle with mobile unit 143 as its center.

Content data acquisition region 501 as shown in FIG. 8 is preferably adopted in the case where the road 502 has a lot of branching locations (intersections) like a general road. This is because it is not possible to predict in a general road a direction in which mobile unit 143 moves at branching location 503 (intersection) except the case where path 144 (see FIG. 1) of mobile unit 143 is beforehand planed, it is necessary to determine all the roads branding at branching location 503 as passage expected roads, and it is required to set surrounding areas of all the passage expected roads as content acquisition region 501.

Further, content acquisition region 501 as shown in FIG. 8 includes a backward area of the mobile unit. In other words, it is considered in content data acquisition region 501 as shown in FIG. 8 that the backward area of mobile unit 143 is also as a passage expected road.

The radius of content data acquisition region 501 may be increased corresponding to the moving speed of mobile unit 143. In this case, content data acquisition region 501 is determined based on the moving speed of mobile unit 143 and the position of mobile unit 143.

Figure 9:
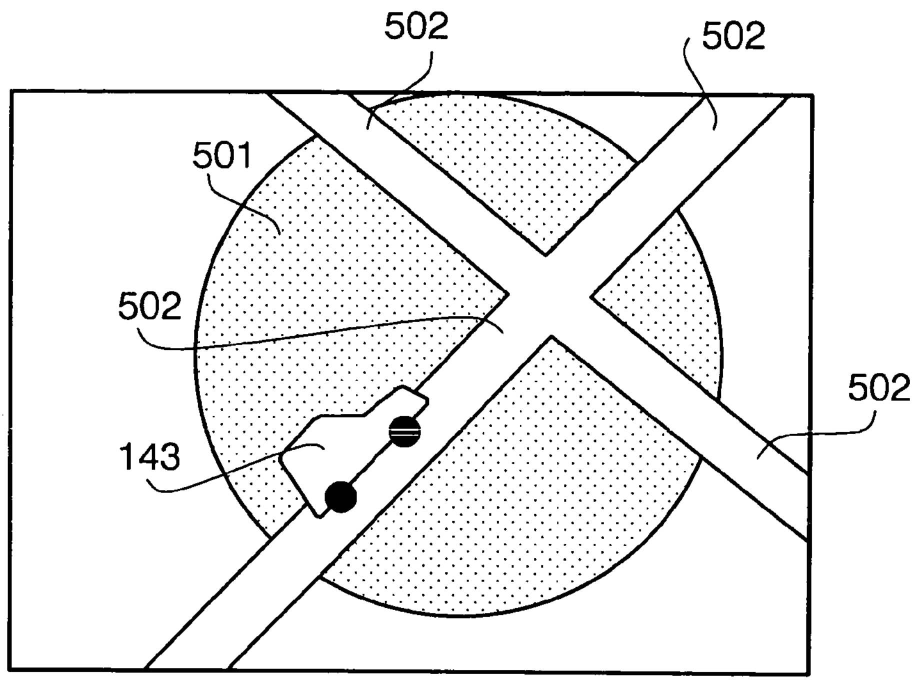
FIG. 9 is a view showing still another example of the content data acquisition region according to the above embodiment.
Figure 10:
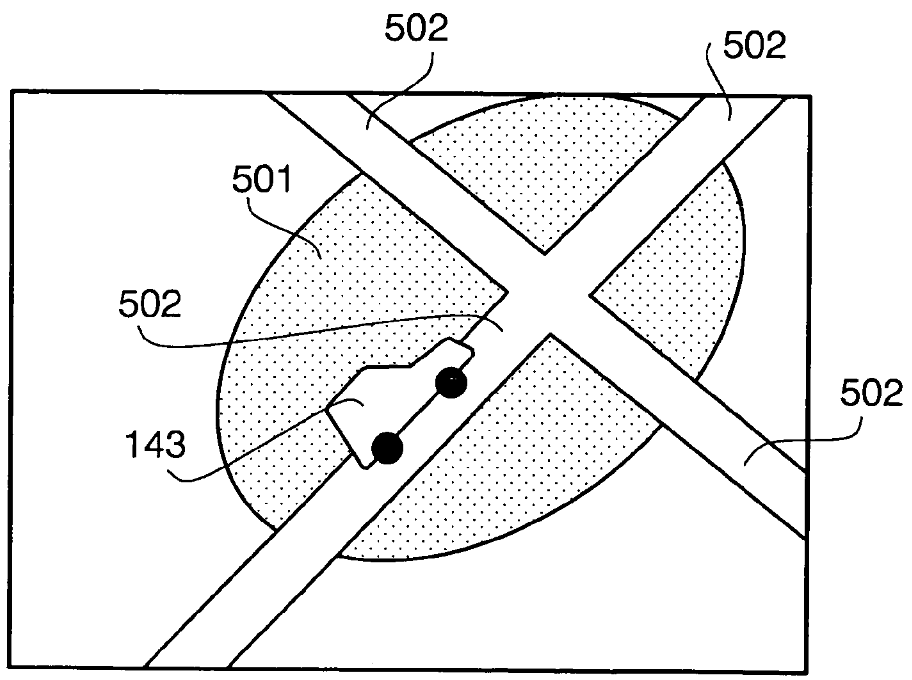
FIG. 10 is a view showing still another example of the content data acquisition region according to the above embodiment.

Another example of the content data acquisition region will be described below with reference to FIGS. 9 and 10. FIGS. 9 and 10 further show other examples of content data acquisition region 501.

Content data acquisition region 501 as shown in FIG. 9 is determined as a circular region with the center positioned forward of mobile unit 143.

Content data acquisition region 501 as shown in FIG. 10 is an oval region extending in the direction in which mobile unit 143 travels. In other words, content data acquisition region 501 as shown in FIG. 10 is determined based on the traveling direction of mobile unit 143 and the moving speed of mobile unit 143.

By determining content data acquisition regions 501 in consideration of the traveling direction (moving direction) of mobile unit 143 as shown in FIGS. 9 and 10, it is possible to efficiently acquire content data having the content position in a position forward of mobile unit 143.

Sizes of content data acquisition regions 501 as shown in FIGS. 7 to 10 may have a constant value always, or may be varied corresponding to the speed of mobile unit 143.

Further, the size of content data acquisition region 501 may be determined to keep the number of items of content data (candidates for content data to acquire) with content positions included in content data acquisition region 501 less than a predetermined limit value.

Otherwise, the size of content data acquisition region 501 may be determined to keep the total size of candidates for content data to acquire less than a predetermined limit value. In addition, it is possible to recognize the size of a candidate for content data to acquire by referring to "size" field 203 of content list 153 as shown in FIG. 4.

Figure 11:
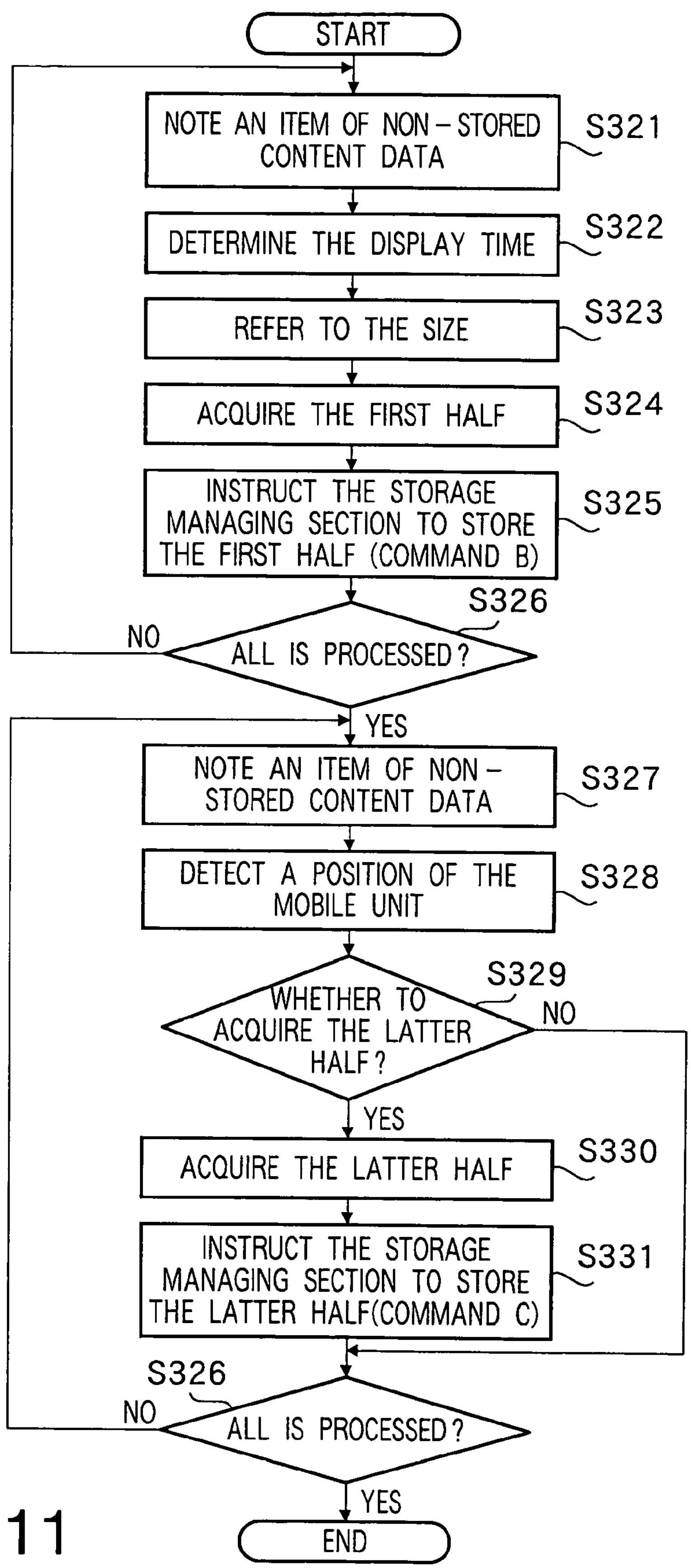
FIG. 11 is a flowchart illustrating processing procedures for acquiring non-stored content data from a content server according to the above embodiment.

Referring to FIG. 11, processing will be described below where terminal apparatus 101 acquires non-stored content data from content server 103 (step S310 in FIG. 6). FIG. 11 is a flowchart illustrating processing procedures for acquiring non-stored content data from the content server according to the above embodiment.

Terminal apparatus 101 separately acquires the first half and latter half of non-stored content data (content data 152).

First, prefetch scheduler 104 in terminal apparatus 101 notes an item of non-stored content data (step S321).

Next, prefetch scheduler 104 determines the time at which the non-stored content data noted in step S321 is displayed on display section 114. The time is determined, for example, to be three minutes before the time expected as the display limit time of content data 152.

When mobile unit 143 passes through the content position of content data 152, the "display limit time" of content data 152 is defined as the time of the passage. When mobile unit 143 does not pass through the content position of content data 152, the "display limit time" of content data 152 is defined as the time at which mobile unit 143 comes the closest to the content position of content data 152.

In addition, when mobile unit 143 does not pass through the content position of content data 152, the "display limit time" may be defined as the time at which mobile unit 143 passes through a branching location on path 144 as the unit 143 approaches the content position of content data 152.

Prefetch scheduler 104 recognizes the content position of content data 152 by referring to "position" field 202 (see FIG. 3) of content list 153. Then, prefetch scheduler 104 determines "the time expected as the display limit time" from the content position, road map, and current position, moving direction and moving speed of mobile unit 143.

Next, prefetch scheduler 104 refers to the size of the content data 152 noted in step S321 (step S323).

Prefetch scheduler 104 recognizes the size of the content data 152, for example, by referring to "size" field 203 of content list 153 as shown in FIG. 4.

Prefetch section 105 in terminal apparatus 101 acquires the first half of the content data 152 noted in step S321 from content server 103 (step S324).

Specifically, prefetch section 105 transmits request 151 (see FIG. 2) to request the first half of the noted content data 152 to content server 103. In response to request 151, content server 103 transmits the first half of the content data 152 to terminal apparatus 101. In this way, prefetch section 105 (acquiring section) acquires part (first half) of the content data 152 via wireless communication path 141.

Prefetch section 105 determines content data 152 to acquire as the first half, for example, by considering the size of the content data 152 noted in step S323.

Further, prefetch section 105 may determine the size of content data 152 to acquire as the first half uniquely to be a predetermined size (for example, 1 MB), irrespective of the size of content data 152. In this case, when the whole size of content data 152 is equal to or less than the predetermined size, prefetch section 105 obtains the whole of the noted content data 152 from content server 103.

In addition, the data structure of request 151 will be described later with reference to FIG. 13.

Next, prefetch scheduler 104 in terminal apparatus 101 instructs storage managing section 112 to store the first half of the content data 152 acquired in step S324 (step S325).

Specifically, prefetch scheduler 104 issues a command (command B) for instructing storage managing section 112 to acquire the first half of the content data 152 to the section 112. In response to the command (command B) issued by prefetch scheduler 104, storage managing section 112 stores the first half acquired in step S324 in prefetch storage section 106 in storage section 113.

In addition, the processing that storage managing section 112 performs in response to command B will be described later specifically with reference to FIG. 15.

Prefetch scheduler 104 determines whether or not the processing of steps S321 to S325 is completed on all the items of non-stored content data (step S326). When a result of the determination in step S326 is "Yes", prefetch scheduler 104 proceeds to processing of step S317. Meanwhile, when a result of the determination in step S326 is "No", prefetch scheduler 104 returns to the processing of step S321.

In step S327, prefetch scheduler 104 notes an item of non-stored content data.

Position detecting section 110 in terminal apparatus 101 detects the position of mobile unit 143 (step S323). In step S323, position detecting section 110 detects the moving direction and moving speed of mobile unit 143, in addition to the position of mobile unit 143.

In the processing of step S328, it is preferable that the time at which acquisition of the latter half of the content data 152 is completed in processing described later is before the display time of the content data 152 determined in step S323 and starts as late as possible. This is because the risk is reduced as much as possible of excessively acquiring the latter half of content data that is not displayed eventually.

The time required for acquiring the latter half of the content data 152 is determined by obtaining the size of the latter half by subtracting the size of the first half of the content data 152 from the size of the content data 152 obtained in step S323, and dividing the size of the latter half by a transmission rate (nominal transmission rate or actual transmission rate) of wireless communication path 141 (FIG. 2).

In addition, a plurality of wireless communication paths 141 may be provided. In this case, prefetch scheduler 104 judges whether or not each of a plurality of wireless communication paths allows communications, and determines wireless communication path 141 to use by considering respective transmission rates, communication charges, and so on of the plurality of wireless communication paths.

Prefetch scheduler 104 in terminal apparatus 101 determines whether or not to acquire the latter half of then on-stored content data noted in step S327 (step S327). This determination is made by judging whether the latter half of the noted non-stored content data will be referred to, based on the position of mobile unit 143 detected in step S328.

Specifically, prefetch scheduler 104 calculates the time required for acquiring the latter half of the noted non-stored content data. Then, prefetch scheduler 104 predicts whether or not mobile unit 143 moves from the position detected in step S328 and passes through the content position of the non-stored content data during the required time. When it is predicted that mobile unit 143 does not pass through the content position during a period of time the latter half of the non-stored content data is acquired, i.e. mobile unit 143 does not pass through the content position before completing acquisition of the latter half of the non-stored content data, prefetch scheduler 104 determines that the latter half of the non-stored content data should be acquired.

In addition, when it is judged that the time at which acquisition of the latter half of non-stored content data is completed is earlier than the display time of the non-stored content data, prefetch scheduler 104 may determine to acquire the latter half of the non-stored content data.

A situation where it is determined that the latter half of non-stored content data should not be acquired occurs, for example, in cases that it has taken a long time to acquire the first half of the non-stored content data in step S324 due to deterioration of communication state of the wireless communication path, etc. and that the speed of mobile unit 143 is high.

When a result of the determination in step S329 is "Yes", terminal apparatus 101 proceeds to processing of step S330. Meanwhile, when a result of the determination in step S329 is "No", terminal apparatus 101 proceeds to processing of step S332.

In step S330, using prefetch section 105, terminal apparatus 101 acquires the latter half of the noted non-stored content data (content data 152) from content server 103.

Prefetch section 105 transmits request 151 (FIG. 2) to request the latter half of the noted content data 152 to content server 103. In response to request 151, content server 103 transmits the latter half of the content data 152 to terminal apparatus 101.

In addition, part of the content data 152 to acquire as the latter half is remaining part of the content data from which the first half is acquired in step S325.

Next, prefetch scheduler 104 in terminal apparatus 101 instructs storage managing section 112 to store the latter half of the content data 152 acquired in step S330.

Specifically, prefetch scheduler 104 issues a command (command C) for instructing storage managing section 112 to store the latter half of the content data 152 acquired in step S330 to the section 112. In response to the command (command C) issued by prefetch scheduler 104, storage managing section 112 stores the latter half acquired in step S330 in prefetch storage section 106 in storage section 113.

In addition, the processing that storage managing section 112 performs in response to command C will be described later specifically with reference to FIG. 16.

Prefetch scheduler 104 in terminal apparatus 101 determines whether or not the processing of steps S327 to S331 is completed on all the items of non-stored content data (step S332). When a result of the determination in step S332 is "Yes", terminal apparatus 101 finishes the processing. Meanwhile, when a result of the determination in step S332 is "No", terminal apparatus 101 returns to the processing of step S327.

As described above, terminal apparatus 101 acquires non-stored content data from content server 103.

In addition, in the example as described above, the size of content data 152 is obtained by referring to "size" field 203 of content list 153 as shown in FIG. 4 in step S323, but such a size may be obtained by inquiring at content server 103.

Figures 12, 13:
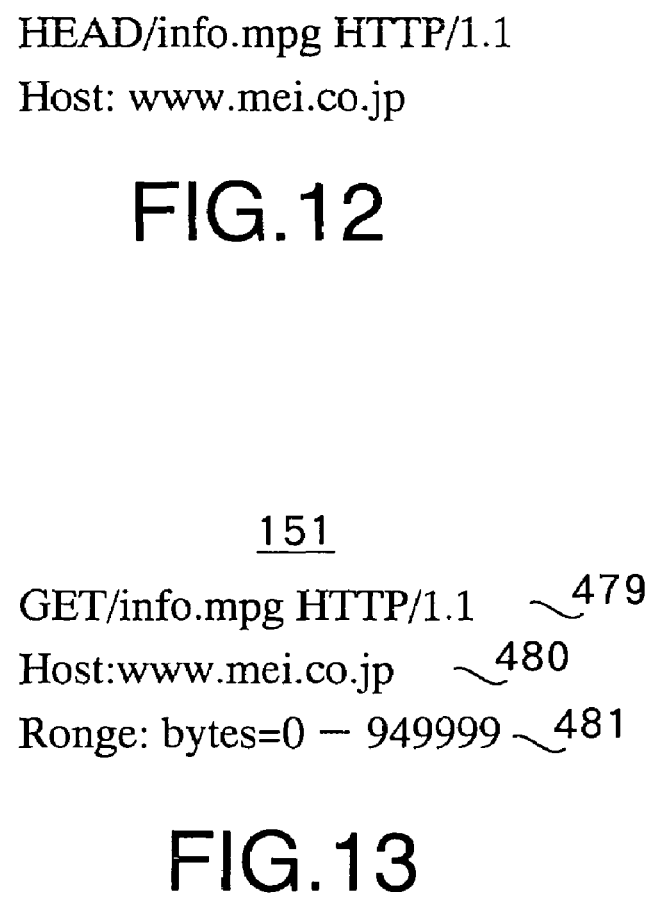

Referring to FIG. 12, a command will be described below that is transmitted when terminal apparatus 101 inquires about the size of content data 152 at content server 103.

A command as shown in FIG. 12 is a command to acquire content of WWW according to the HTTP protocol. The HTTP protocol is described in a web page of http://www.ietf.org/rfc/rfc2616.txt provided by the Internet Engineering Task Force.

When terminal apparatus 101 uses the command as shown in FIG. 12, it is not required to describe the size of content data 152 in content list 153.

Referring to FIG. 13, request 151 will be described below that terminal apparatus 101 transmits to content server 103 in step S324 (FIG. 11).

Request 151 as shown in FIG. 13 is a request in the case of using the HTTP protocol. Request 151 is generated in prefetch section 105 (FIG. 2), and is transmitted to content server 103 via wireless communication path 141. In response to request 151, content server 103 transmits content data 152 to terminal apparatus 101.

Row 481 in request 151 indicates that terminal apparatus 101 requests content server 103 to transmit 1 MB: 0th byte to 949999th byte of content data 152.

The text content of WWW is generally accommodated in size in 1 MB. However, when content data 152 is comprised of text and moving picture with "info.mpg", the total size sometimes exceeds 1 MB. In this case, in step S324, terminal apparatus 101 acquires the entire text and part (for example, beginning part) of moving picture with "info.mpg" as the first half of content data 152. For example, when the size of text is 50 KB, terminal apparatus 101 acquires the entire text and 950 KB of moving picture with "info.mpg".

Rows 479 and 480 in request 151 designate as a whole an address of content data 152.

In this way, prefetch section 105 acquires the first half of the content data based on the address of content data 152 via wireless communication path 141.

Figure 14:
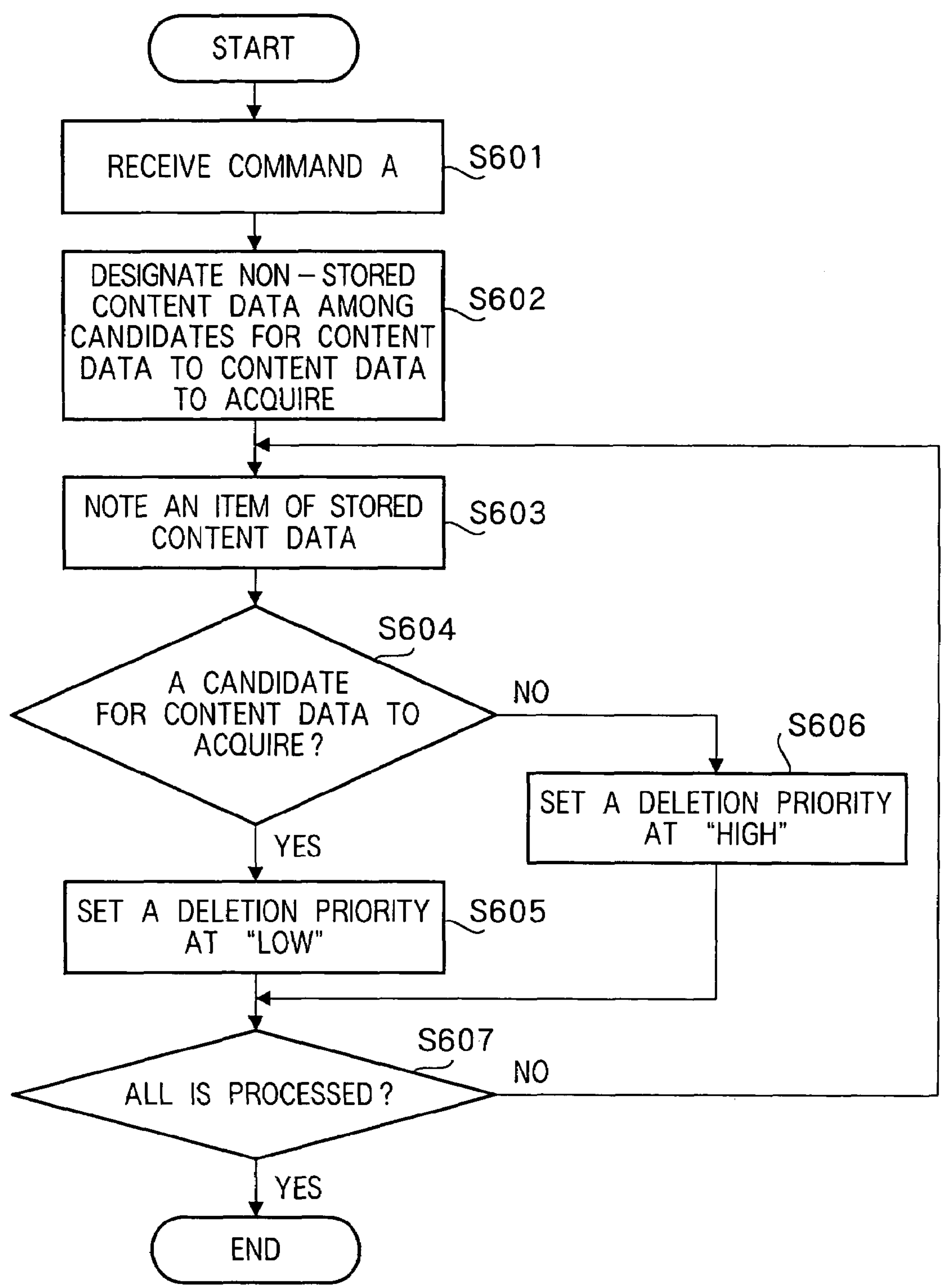
FIG. 14 is a flowchart illustrating processing that a storage managing section performs when receiving command A according to the above embodiment.

Referring to FIG. 14, the processing will be described below that storage managing section 112 performs when receiving command A. FIG. 14 is a flowchart illustrating the processing that storage managing section 112 performs when receiving command A.

As described above, in step S309 (FIG. 6), prefetch scheduler 104 issues command A to determine non-stored content data among candidates for content data to acquire to storage managing section 112.

In response thereto, storage managing section 112 receives command A issued by prefetch scheduler 104 (step S601). At this point, storage managing section 112 receives a list of candidates for content data to acquire from prefetch scheduler 104.

Storage managing section 112 designates content data that is not stored in storage section 113 as non-stored content data among candidates for content data to acquire described in the list of the candidates for content data to acquire (step S602).

Specifically, storage managing section 112 checks whether each of the candidates for content data to acquire described in the list of the candidates for content data to acquire is stored in either prefetch storage section 106, displayed first-half storage section 107, or displayed latter-half storage section 108, and thereby designates non-stored content data.

In addition, it happens that the first half of some content data is stored in displayed first-half storage section 107, but the latter half of the content data is not stored in displayed latter-half storage section 108. This is because different deletion priorities are assigned to the first half and latter half of the content data as described later with reference to FIG. 21.

Storage managing section 112 designates, as non-stored content data, content data such that the first half is stored in displayed first-half storage section 107, but the latter half is not stored in displayed latter-half storage section 108. However, prefetch scheduler 104 does not acquire the first half of such content data in step S324 (FIG. 11).

Further, the deletion priority as described above is one attribute assigned by storage managing section 112 to data stored in storage section 113. Data with the deletion priority of "high" is apt to be deleted faster than data with the deletion priority of "low".

Storage managing section 112 returns the list of the candidates for content data to store designated in step 602 to prefetch scheduler 104.

Storage managing section 112 notes an item of stored content data (step S603). The stored content data herein is content data stored in storage section 113.

Next, storage managing section 112 determines whether the stored content data noted in step S603 is contained in the list of the candidates for content data to acquire (step S604).

When a result of the determination in step S604 is "Yes", storage managing section 112 proceeds to processing of S605. Meanwhile, when a result of the determination in step S604 is "No", storage managing section 112 proceeds to processing of step S606.

In step S605, storage managing section 112 sets a deletion priority to assign to the stored content data noted in step S603 at "low". Further, in step 605, storage managing section 112 sets deletion priorities to assign to the first half and latter half of the stored content data noted in step S603 at both "low".

In step S606, storage managing section 112 sets a deletion priority to assign to the stored content data noted in step S603 at "high". This is because when the stored content data noted in step S603 is not contained in the list of the candidates for content data to acquire, there is a high possibility that such stored content data is not needed, i.e. not displayed ultimately.

Further, in step S606, storage managing section 112 sets deletion priorities to assign to the first half and latter half of the stored content data noted in step S603 at both "high".

Storage managing section 112 determines whether the processing of steps S603 to S606 is finished on all the stored content data (step S607). When a result of the determination in step S607 is "Yes", storage managing section 112 finishes the processing. Meanwhile, when a result of the determination in step S607 is "No", storage managing section 112 returns to the processing of step S603.

In this way, when receiving command A, storage managing section 112 sets a deletion priority of stored content data.

Figure 15:
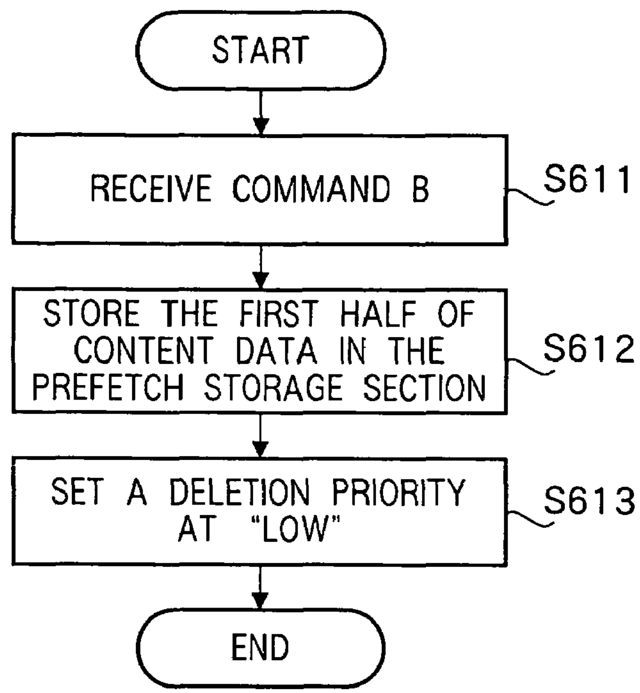
FIG. 15 is a flowchart illustrating processing that the storage managing section performs when receiving command B according to the above embodiment.

Referring to FIG. 15, the processing will be described below that storage managing section 112 performs when receiving command B.

As described above, in step S325 (FIG. 11), prefetch scheduler 104 issues command B to store the first half of content data 152 in storage section 113 to storage managing section 112.

In response thereto, storage managing section 112 receives command B (step S611). At this point, storage managing section 112 receives the first half of content data 152 from prefetch section 105.

Storage managing section 112 stores the first half of content data 152 in prefetch storage section 106 in storage section 113 (step S612).

Next, storage managing section 112 sets a deletion priority of the first half stored in prefetch storage section 106 in storage section 113 at "low".

In this way, when receiving command B, storage managing section 112 sets a deletion priority of content data 152.

Figure 16:
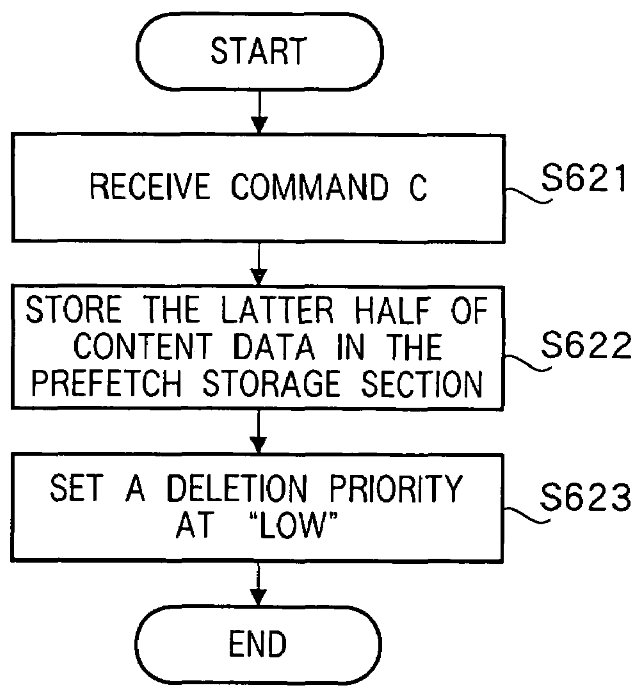
FIG. 16 is a flowchart illustrating processing that the storage managing section performs when receiving command C according to the above embodiment.

Referring to FIG. 16, the processing will be described below that storage managing section 112 performs when receiving command C. FIG. 16 is a chart illustrating the processing that the storage managing section performs when receiving command C.

As described above, in step S331 (FIG. 11), prefetch scheduler 104 issues command C to store the latter half of content data 152 in storage section 113 to storage managing section 112.

In response thereto, storage managing section 112 receives command C (step S621). At this point, storage managing section 112 receives the latter half of content data 152 from prefetch section 105.

Storage managing section 112 stores the latter half of content data 152 in prefetch storage section 106 in storage section 113 (step S622).

Next, storage managing section 112 sets a deletion priority of the latter half stored in prefetch storage section 106 in storage section 113 at "low" (step S623).

In this way, when receiving command C, storage managing section 112 sets a deletion priority of content data 152.

Figure 17:
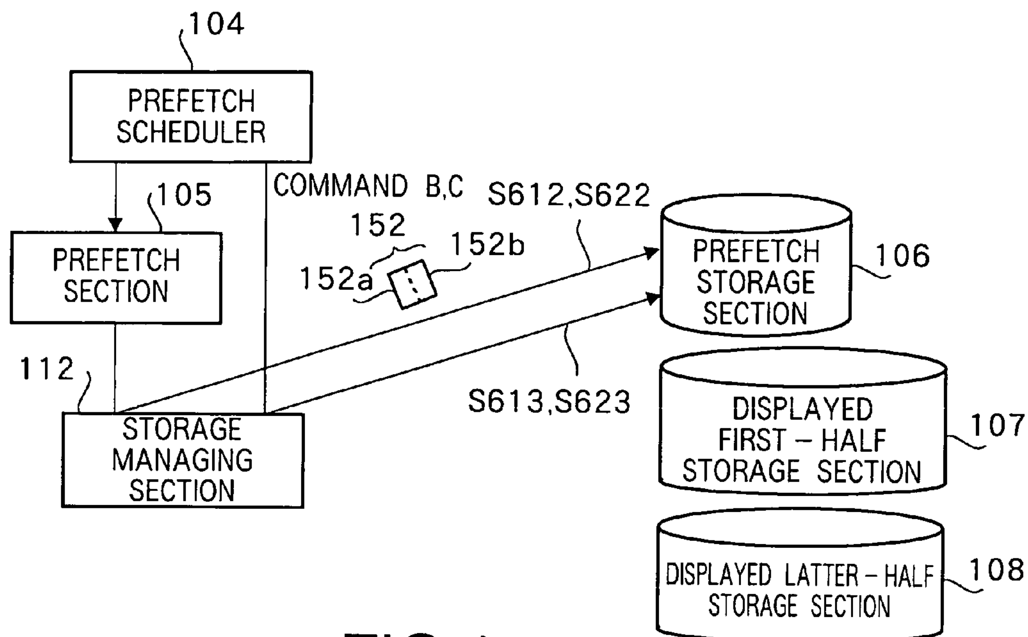
FIG. 17 is a view illustrating the flow of processing when the storage managing section receives command B or C according to the above embodiment.

FIG. 17 shows the flow of processing when storage managing section 112 receives command B or C. FIG. 17 is a view schematically illustrating the flow of processing when the storage managing section receives command B or C. In addition, in FIG. 17, reference numerals with "S" at the beginning denote corresponding "step S" as shown in FIG. 15 or FIG. 16, and overlapping descriptions are omitted.

Storage managing section 112 performs the processing as shown in FIG. 17 when receiving command B or C.

Figure 18:
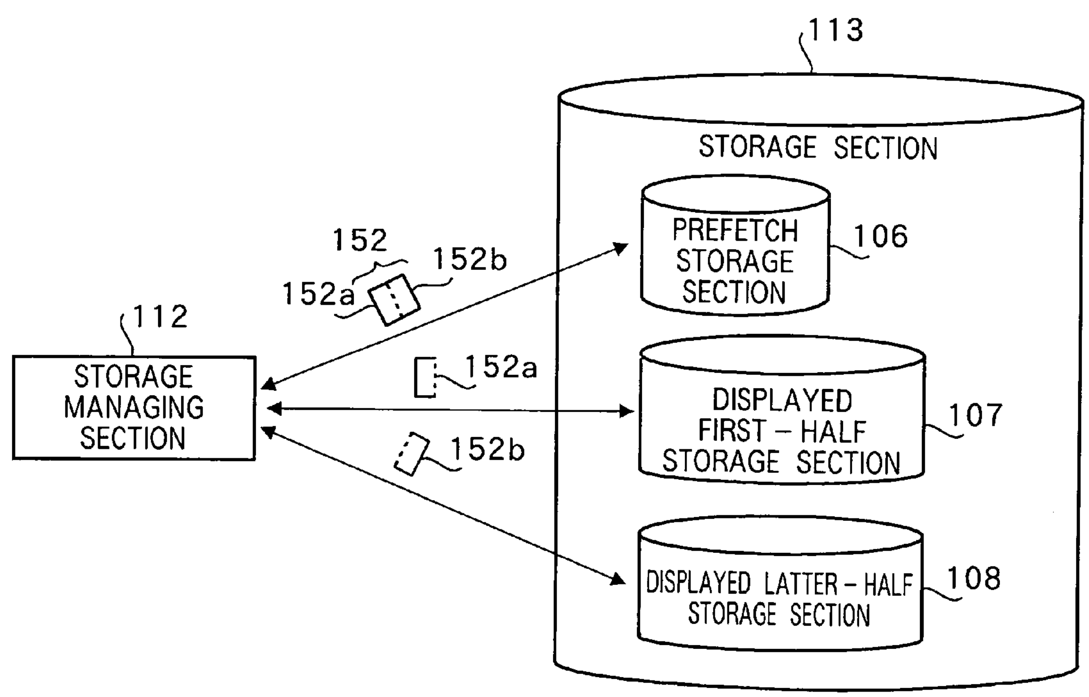
FIG. 18 is a view schematically showing the storage managing section managing data to store in a prefetch storage section, displayed first-half storage section, and displayed latter-half storage section according to the above embodiment.

Management of storage section 113 by storage managing section 112 will be described below with reference to FIG. 18. FIG. 18 is a view schematically showing storage managing section 112 managing data to store in prefetch storage section 106, displayed first-half storage section 107, and displayed latter-half storage section 108.

Storage managing section 112 reads and writes non-displayed content data 152 from/in prefetch storage section 106. Content data 152 is comprised of first half 152*a* and latter half 152*b*. Storage managing section 112 reads and writes the first half 152*a* of non-displayed content data 152 from/in displayed first-half storage section 107, while reading and writing the latter half 152*b* of non-displayed content data 152 from/in displayed latter-half storage section 108.

Figure 19:
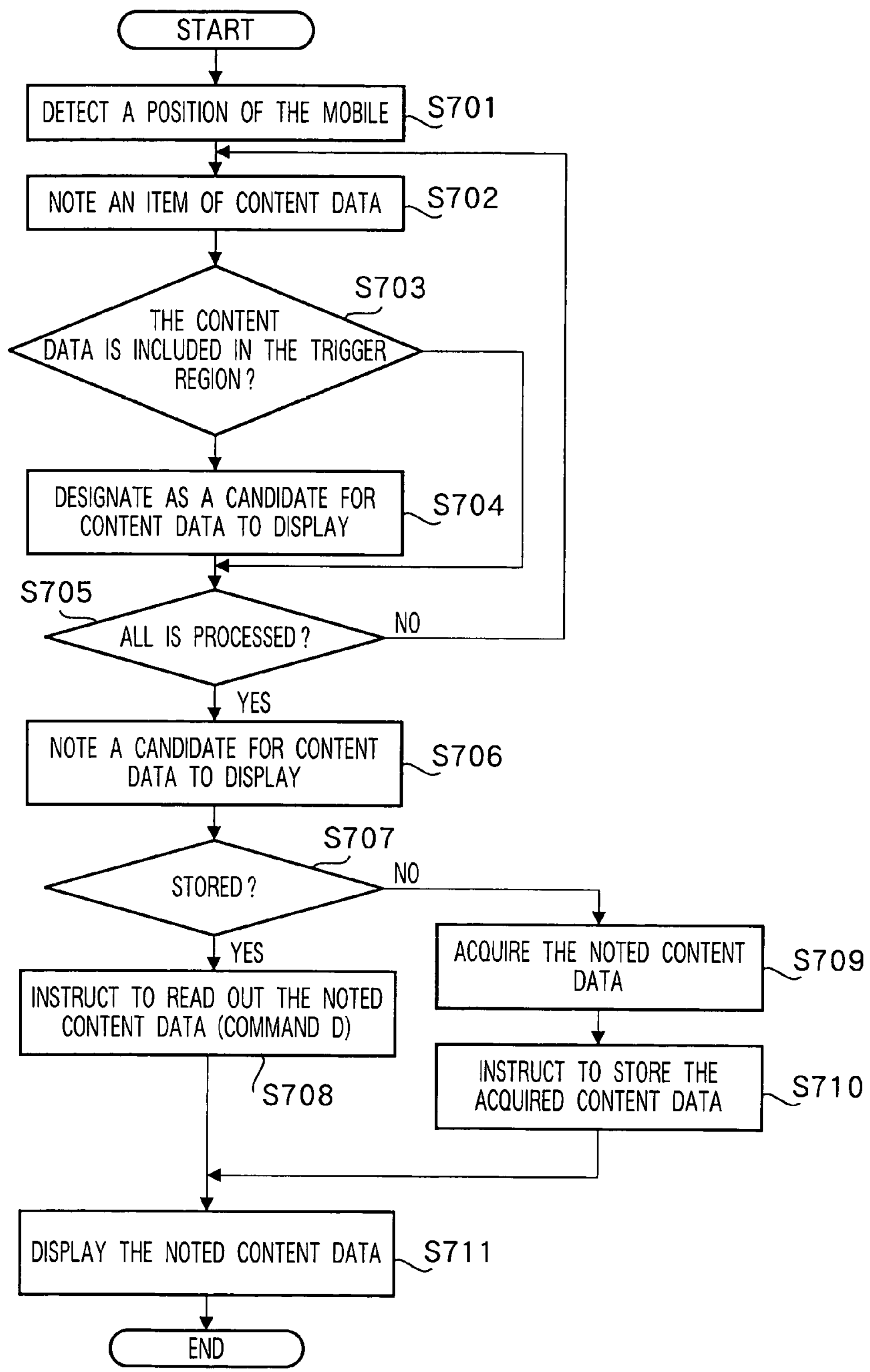
FIG. 19 is a flowchart illustrating processing for the terminal apparatus to control timing for displaying the content data according to the above embodiment.

Referring to FIG. 19, the processing will be described below that terminal apparatus 101 controls timing for displaying content data 152. FIG. 19 is a chart illustrating the processing for terminal apparatus 101 to control the timing for displaying content data 152.

The processing as illustrated in FIG. 19 is repeated at predetermined time intervals during a period of time mobile unit 143 is moving. Otherwise, the processing as illustrated in FIG. 19 may be repeated whenever mobile unit 143 moves a predetermined distance.

Terminal apparatus 101 detects a position of mobile unit 143 (step S701). Position detecting section 110 performs the detection. In step S701, position detecting section 110 further detects the speed of mobile unit 143.

Display control section 109 in terminal apparatus 101 notes an item of content data 152 (record) in content list 153 (step S702). Content list 153 is already acquired in step S301 (FIG. 6).

Display control section 109 determines whether or not the position (content position) to which is related the content data 152 noted in step S702 is included in a content data display trigger region that is a region to determine whether or not to display the noted content data (step S703).

The content data display trigger region is determined based on the position of mobile unit 143 detected in step S701. The content data display trigger region is determined as a region of positions to which mobile unit 143 is expected to move in a predetermined time, for example, three minutes.

Display control section 109 determines whether or not it is predicted that mobile unit 143 reaches the content position in three minutes (predetermined time) after moving from the position detected in step S701, and thereby determines whether or not the content position is included in the content data display trigger region.

When a result of the determination in step S703 is "Yes", display control section 109 proceeds to processing of S704. Meanwhile, when a result of the determination in step S703 is "No", display control section 109 proceeds to processing of step S705.

In step S704, display control section 109 designates the noted content data 152 as a candidate for content data to display.

Instep S705, display control section 109 determines whether the processing of steps S702 to S704 is completed on all the content data of content list 153.

When a result of the determination in step S705 is "Yes", display control section 109 proceeds to processing of step S706. Meanwhile, when a result of the determination in step S705 is "No", display control section 109 returns to the processing of step S702.

In step S706, display control section 109 notes one of candidates for content data to display.

Display control section 109 determines whether or not the noted content data 152 is stored in storage section 113 (step S707). Display control section 109 makes such a determination by inquiring at storage managing section 112.

In addition, when at least first half of the noted content data 152 is stored in storage section 113, a result of the determination in step S707 is "Yes".

When a result of the determination in step S707 is "Yes", display control section 109 proceeds to processing of step S708. Meanwhile, when a result of the determination in step S707 is "No", display control section 109 proceeds to processing of step S709.

In step S708, display control section 109 issues command D to storage managing section 112 and thereby instructs the section 112 to read out the noted content data 152 from storage section 113.

In response to the command (command D) issued by display control section 109, storage managing section 112 reads out the noted content data 152 from storage section 113.

In addition, the specific processing that storage managing section 112 performs in response to command D will be described later with reference to FIG. 21.

In step S709, display control section 109 acquires the noted content data 152 from content server 103. Display control section 109 transmits request 151 (see FIG. 2) to content server 103 and thereby acquirers the content data 152.

In addition, in step S709, display control section 109 may acquire the first half and latter half of content data 152 separately, acquire the whole of content data 152 at a time, or acquire only the first half of content data 152.

Next, display control section 109 issues command E to storage managing section 112 and thereby instructs the section 112 to store the content data 152 acquired in step S709 (step S710).

In response to the command (command E) issued by display control section 109, storage managing section 112 stores the first half and latter half of the content data 152 acquired in step S709 respectively in displayed first-half storage section 107 and displayed latter-half storage section 108.

Figure 23:
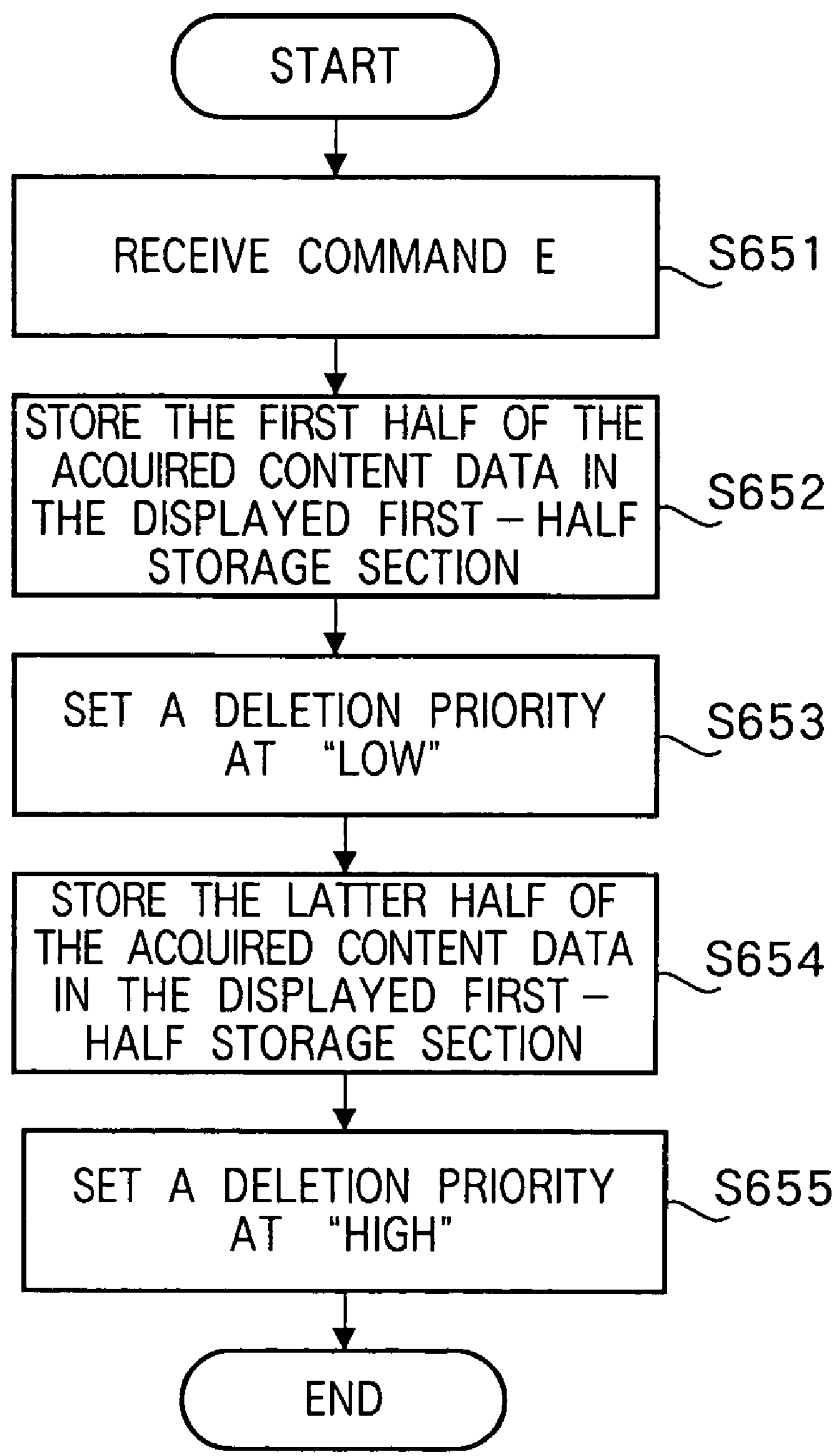
FIG. 23 is a flowchart illustrating processing that the storage managing section performs when receiving command E according to the above embodiment.

In addition, the specific processing that storage managing section 112 performs in response to command E will be described later with reference to FIG. 23.

Display control section 109 displays the noted content data 152 on display section 114 (step S711).

In addition, when only the first half of noted content data 152 is stored in storage section 113 in step S707 and therefore, only the first half of content data 152 is read out in step S708, display control section 109 displays only the first half on display section 114. Further, when only the first half of content data 152 is acquired in step S709, the section 109 displays only the first half on display section 114. When the first half of content data 152 is comprised of entire text and part of moving picture, display control section 109 displays the entire text and the part of moving picture (i.e., to the middle of the moving picture).

In this way, display control section 109 displays content data 152.

Figure 20:
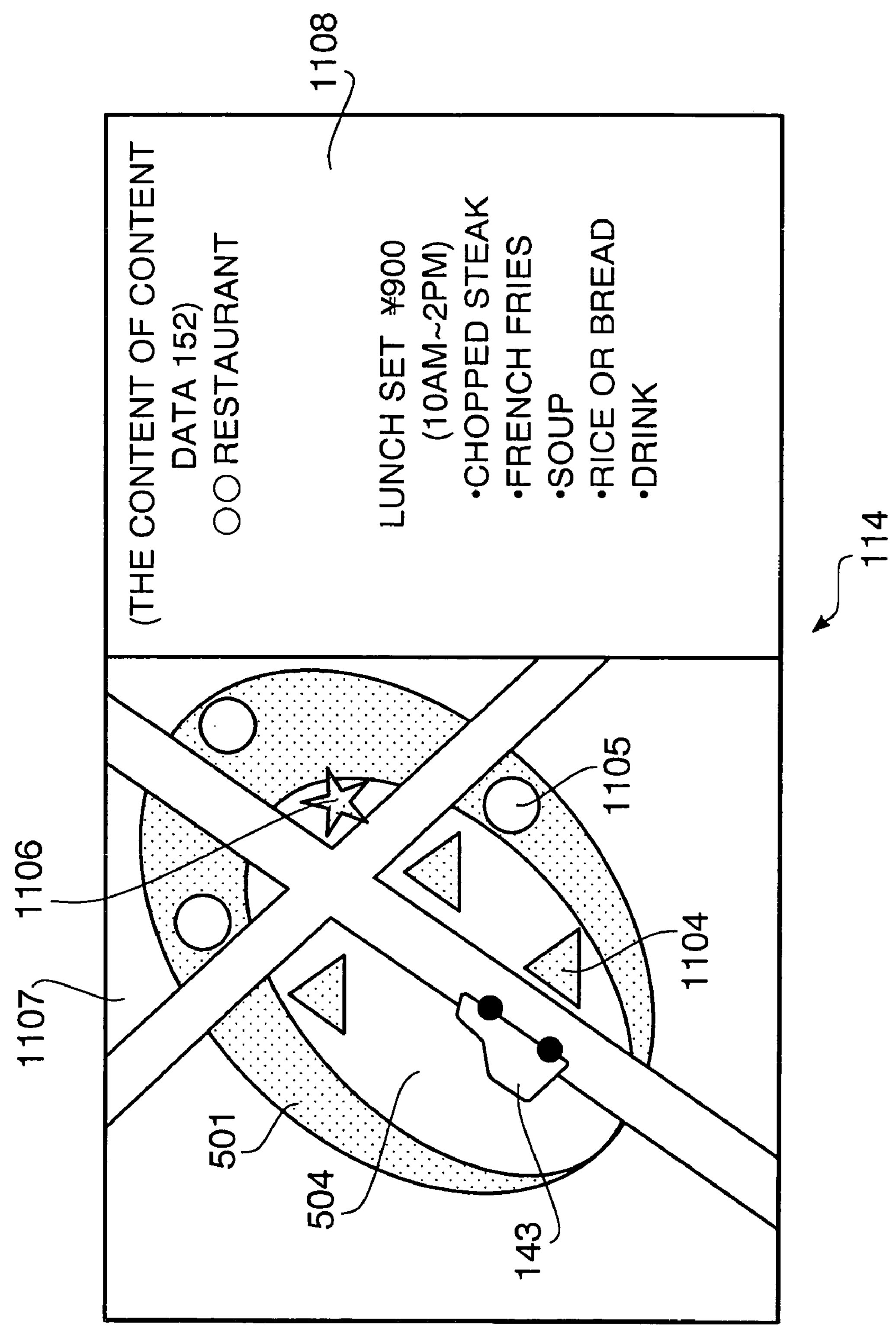
FIG. 20 is a view showing a display section displaying the content data according to the above embodiment.

Content data 152 displayed on display section 114 will be described with reference to FIG. 20. FIG. 20 is a view showing content data 152 displayed on display section 114 (FIG. 1).

In region 1107, content data acquisition region 501 and content data display trigger region 504 are superimposed and displayed on a road map around mobile unit 143. The content of content data 152 is displayed in region 1108. In the example as shown in FIG. 20, content data 152 is advertising information of a restaurant.

Further, in FIG. 20, triangles with hatchings shown in region 1107 indicate content positions 1104 of content included in content data display trigger region 504. White circles indicate content positions 1105 that are included in content data acquisition region 501 but are not included in content data display trigger region 504. A star with hatchings indicates content position 1106 of content data 152 currently displayed in region 1108.

In addition, region 1108 may automatically display content data whose content positions are included in content data display trigger region 504 sequentially, or may display the content of content data related to content position 1104 when a user designates the content position 1104 displayed in region 1107.

A summary of content expressed by the content data and/or name of a facility related to the content may be displayed on the map (or outside the map) displayed in region 1107, which is achieved by adding such a summary and name of the facility to content list 153.

Content data acquisition region 501 and content data display trigger region 504 move as mobile unit 143 moves. As shown in FIG. 20, content data display trigger region 504 at some point is determined so that the entire region 504 is included in content data acquisition region 501 at the some point.

As described with reference to FIGS. 6 and 19, prefetch scheduler 104 and display control section 109 respectively control the timing for acquiring content data 152 and the timing for displaying the data 152 based on whether the content position is included in content data acquisition region 501 and in content data display trigger region 504.

Accordingly, display control section 109 controls the timing for displaying content data 152 so as to display the content data 152 when mobile unit 143 is relatively close to the content position of the noted content data 152. Meanwhile, prefetch scheduler 104 controls the timing for acquiring content data 152 so as to acquire (prefetch) the content data 152 before the data 152 is displayed on display section 114.

Only when such "prefetch" is not carried out due to any reason (exception case), a result of the determination in step S707 (FIG. 19) is "No". Such a result is "Yes" in other cases.

The processing that storage managing section 112 receives command D will be described below with reference to FIG. 21. FIG. 21 is a chart illustrating the processing that storage managing section 112 performs when receiving command D.

As described above, when a result of the determination in step S707 is "Yes", display control section 109 issues command D to instruct storage managing section 112 to read out the noted content data 152 from storage section 113 (step S708).

In response thereto, storage managing section 112 receives command D (step S632). At this point, display control section 109 notifies storage managing section 112 of the content data 152 noted in step S702 in FIG. 19.

Storage managing section 112 determines whether or not the noted content data 152 is stored in prefetch storage section 106 (step S633). Storage managing section 112 makes this determination by searching prefetch storage section 106.

When a result of the determination in step S633 is "Yes", storage managing section 112 proceeds to processing of S641. Meanwhile, when a result of the determination in step S633 is "No", storage managing section 112 proceeds to processing of step S634.

In step S634, storage managing section 112 reads out the first half of the noted content data 152 from displayed first-half storage section 107.

Next, storage managing section 112 determines whether the latter half of the noted content data 152 is stored in displayed latter-half storage section 108 (step S635). Storage managing section 112 makes this determination by searching displayed latter-half storage section 108.

When a result of the determination in step S635 is "Yes", storage managing section 112 proceeds to processing of S37. Meanwhile, when a result of the determination in step S635 is "No", storage managing section 112 proceeds to processing of step S636.

In step S636, storage managing section 112 returns the first half of noted content data 152 read in step S634 to display control section 109, and then, proceeds to processing of step S640.

In step S637, storage managing section 112 reads out the latter half of the noted content data 152 from displayed latter-half storage section 108.

Next, storage managing section 112 returns the read first half and second half of the noted content data 152 to display control section 109 (step S638).

Storage managing section 112 sets a deletion priority of the latter half of the noted content data 152 at "high" (step S639).

Storage managing section 112 sets a deletion priority of the first half of noted content data 152 at "low" (step S640). This is because when content data 152 that is displayed and then stored in storage section 113 is read out again to be displayed, there is a possibility of reusing the content data 152 in the future.

Then, storage managing section 112 shifts to processing of step S641 after performing the processing of S640.

In step S641, storage managing section 112 reads out the noted contend data 152 (the first half and latter half) from prefetch storage section 106.

Storage managing section 112 returns the read content data 152 to display control section 109 (step S642).

Storage managing section 112 deletes the noted content data 152 from prefetch storage section 106 (step S643)

Storage managing section 112 stores the first half of the noted content data 152 in displayed first-half storage section 107 (step S644).

Storage managing section 112 sets a deletion priority to assign to the first half of the noted content data 152 at "low" (step S645).

In addition, it may be possible that in the case where path 144 (FIG. 1) of mobile unit 143 is planned in advance and the content position of content data 152 is on (or near) path 144, in step S645, storage managing section 112 sets a deletion priority to assign to the first half of content data 152 at "low", while setting such a priority at "high" in other cases.

Storage managing section 112 stores the latter half of the noted content data 152 in displayed latter-half storage section 108 (step S646).

Storage managing section 112 sets a deletion priority to assign to the latter half of the noted content data 152 at "high" (step S647).

Then, storage managing section 112 updates the reference time of the noted content data 152 to the present time (step S648)

The reference time is one of attributes that storage managing section 112 assigns to data stored in storage section 113, and data with old reference time is apt to be deleted faster than data with new reference time. Further, when data (for example, content data 152) is newly stored in storage section 113, the time the data 152 is stored is assigned as the reference time.

Figure 21:
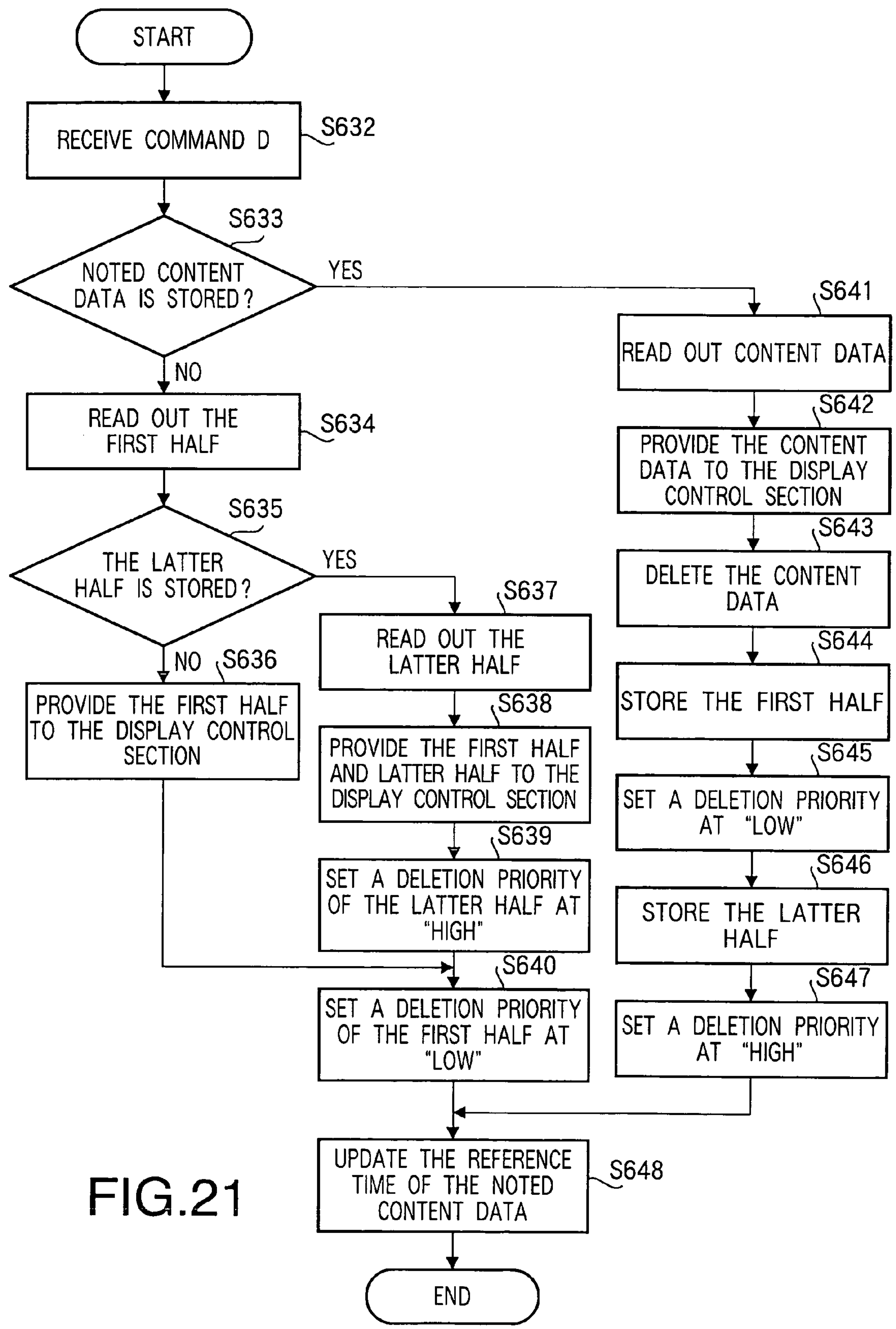
FIG. 21 is a flowchart illustrating processing that the storage managing section performs when receiving command D according to the above embodiment.

As can be seen from FIG. 19, the processing as illustrated in FIG. 21 is carried out immediately before content data 152 is displayed on display section 114. Steps S643 to S647 as described above correspond to the processing that content data 152 stored in prefetch storage section 106 in storage section 113 is transferred to displayed first-half storage section 107 and displayed latter-half storage section 108 when the content data 152 is displayed on display section 114.

Figure 22:
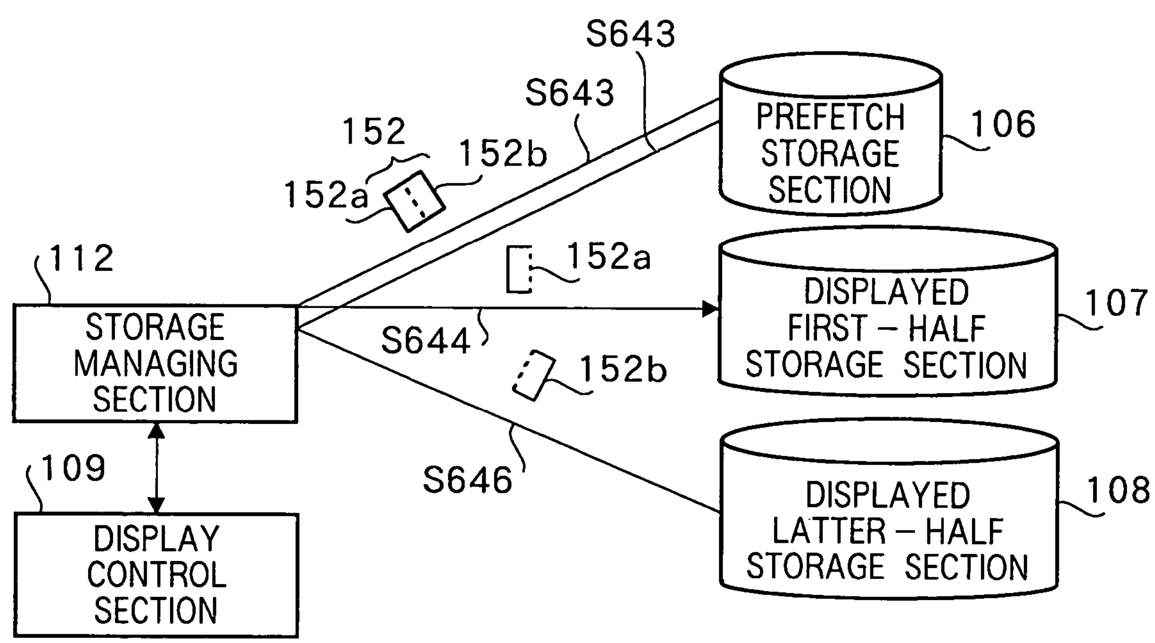
FIG. 22 is a view schematically showing the flow of the processing for the storage managing section to transfer the content data stored in the prefetch storage section in the storage section to the displayed first-half storage section and displayed latter-half storage section according to the above embodiment.

FIG. 22 schematically shows the flow of the processing for storage managing section 112 to transfer content data 152 stored in prefetch storage section 106 in storage section 113 to displayed first-half storage section 107 and displayed latter-half storage section 108. In FIG. 22, reference numerals with "S" at the beginning denote corresponding "step S" as shown in FIG. 22, and overlapping descriptions are omitted.

In this way, when storage managing section 112 receives command D, the section 112 transfers content data 152 to displayed first-half storage section 107 and displayed latter-half storage section 108.

The processing that storage managing section 112 receives command E will be described below with reference to FIG. 23. FIG. 23 is a chart illustrating the processing that storage managing section 112 performs when receiving command E.

As described above, when a result of the determination in step S707 (FIG. 19) is "No", display control section 109 issues command E to storage managing section 112 to instruct to store the acquired content data 152 in storage section 113 (step S710).

In response thereto, storage managing section 112 receives command E (step S651). At this point, storage managing section 112 receives the content data 152 acquired in display control section 109 in step S709 (FIG. 19).

Storage managing section 112 stores the first half of the acquired content data 152 in displayed first-half storage section 107 (step S652).

Storage managing section 112 sets a deletion priority to assign to the first half stored in displayed first-half storage section 107 at "low" (step S653).

Storage managing section 112 stores the latter half of the acquired content data 152 in displayed latter-half storage section 108 (step S654).

Then, storage managing section 112 sets a deletion priority to assign to the latter half stored in displayed latter-half storage section 107 at "high" (step S655).

In this way, storage managing section 112 sets a deletion priority when receiving command E.

Figure 24:
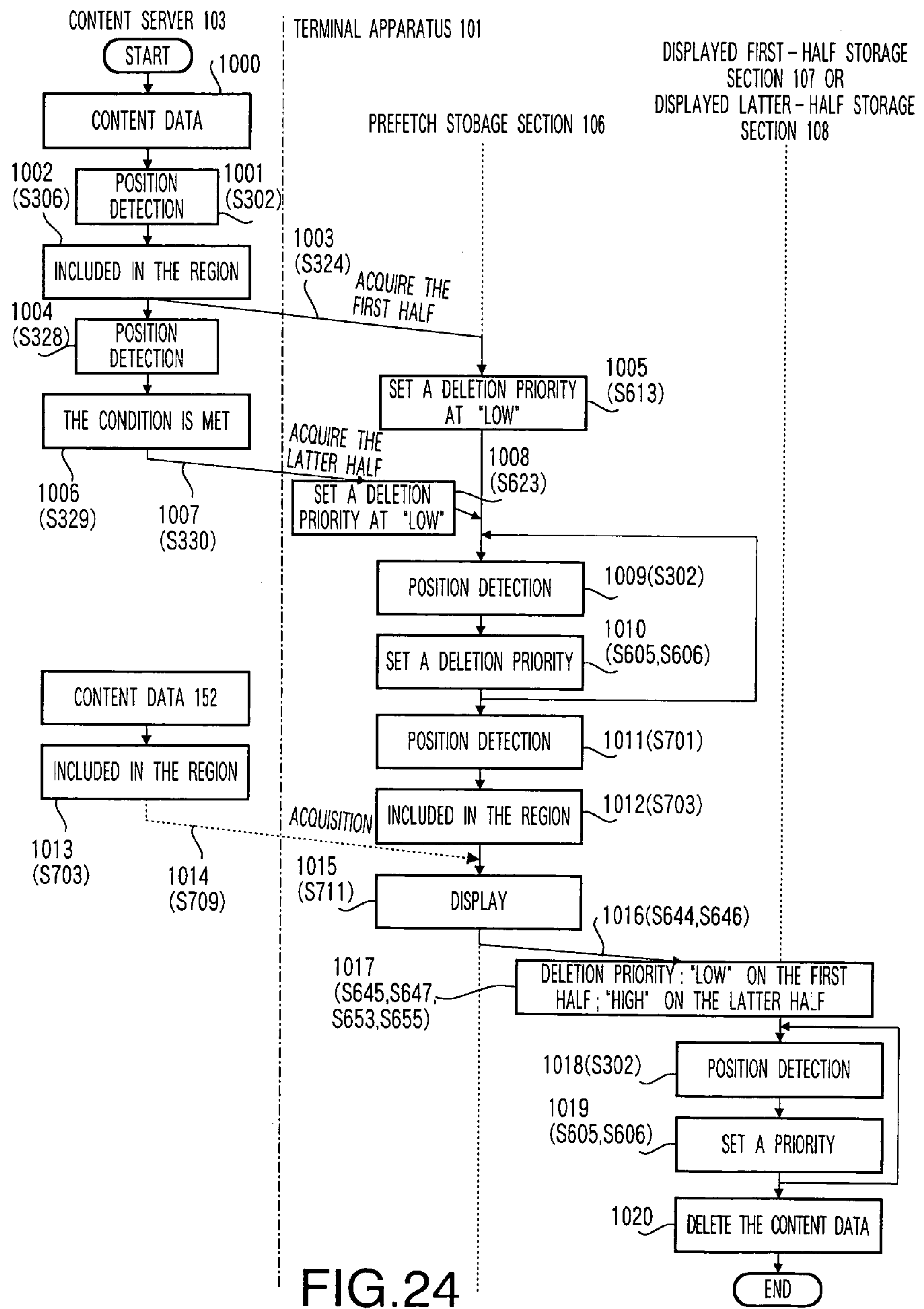
FIG. 24 is a view showing processing for the terminal apparatus to perform on content data in acquiring the content data to display according to the above embodiment.

The processing for terminal apparatus 101 to acquire content data 152 to display will be described below with reference to FIG. 24. FIG. 24 is a view showing the processing for terminal apparatus 101 to perform on an item of content data 152 in acquiring the item of content data 152 to display. In FIG. 24, positions in right and left directions indicate locations where noted content data 152 is stored. Further, reference numerals indicated inside parentheses correspond to respective processing procedures (steps) in FIG. 6, FIG. 11, FIGS. 14 to 16, FIG. 19, FIG. 21 and FIG. 23. In FIG. 6, FIG. 11, FIGS. 14 to 16, FIG. 19, FIG. 21 and FIG. 23, each step is indicated with attention drawn to the processing to perform. In FIG. 24, each step is indicated with attention drawn to an item of content data 152 targeted for processing. Each step is a step (stage) that is performed on a noted item of content data 152.

Content data 152 is first stored in content server 103 (stage 1000).

As mobile unit 143 moves inside region 146, when it is determined that a position (first position) of mobile unit 143 detected in stage 1001 and the content position meet a condition (first condition) that "the content position is included in a content data acquisition region determined based on the first position" (stage 1002), terminal apparatus 101 acquires the first half of content data 152 (stage 1003).

Prefetch scheduler 104 makes a determination in stage 1002.

The first half of the content data 152 acquired in stage 1003 is stored in prefetch storage section 106. At this point, a deletion priority assigned to the first half of the content data 152 is set at "low" (stage 1005).

After the first half of the content data 152 is acquired, when a position (second position) of mobile unit 143 in stage 1004 and the content position meet a condition (second condition) in step S329 (FIG. 11) (stage 1006), terminal apparatus 101 acquires the latter half of the content data 152 (stage 1007).

In this way, content data 152 is acquired in separated two stages.

Whether to further acquire the latter half of the content data 152 after acquiring the first half of the content data 152 is determined based on the position (second position) of mobile unit 143 after acquiring the first half of content data 152. Accordingly, the content data is prevented from being acquired uselessly. As a result, it is possible to use the transmission math (wireless communication path 141) efficiently.

The latter half of the content data 152 acquired in stage 1007 is stored in prefetch storage section 106. At this point, a deletion priority assigned to the latter half of the content data 152 is set at "low" (stage 1008).

As described above, the processing as illustrated in FIG. 6 is repeated at predetermined time intervals or intervals at which mobile unit 143 moves a predetermined distance during a period of time mobile unit 143 is moving. Accordingly, the processing as illustrated in FIG. 14 is repeated in the same way that performed by storage managing section 112 in response to step S309 as illustrated in FIG. 6.

Step S306 (FIG. 6) is performed on each content data contained in content list 153, and therefore, performed on content data 152 stored in prefetch storage section 106.

Accordingly, after the first half and latter half of the content data 152 are acquired, as mobile unit 143 moves inside region 146, it is determined whether or not a position (fourth position) of mobile unit 143 detected in stage 1009 and the content position meet a condition (fourth condition) that "the content position is contained in a content data acquisition region determined based on the fourth position". Prefetch scheduler 104 makes this determination (step S306 as illustrated in FIG. 6).

Corresponding to a result of the determination, storage managing section 112 determines a deletion priority to assign to the content data 152 (stage 1010).

Stages 1009 and 1010 are performed repeatedly until content data 152 stored in prefetch storage section 106 is displayed. As a matter of course, when content data 152 is displayed immediately after being stored in prefetch storage section 106, stages 1009 and 1010 are not performed on the content data 152.

When the content position of the content data 152 is not included in the content data acquisition region determined based on the fourth position in stage 1010, a deletion priority assigned to content data 152 is set at "high". Thus, the content data 152 is apt to be deleted from storage section 113 faster. As a result, an advantage is obtained that it is possible to effectively use the storage capacity of storage section 113.

In addition, this advantage is obtained irrespective of whether content data 152 is separately acquired in two stages. Similarly, the advantage of efficiently use the transmission path obtained by separately acquiring content data 152 in two stages is obtained irrespective of assigning any deletion priority to content data stored in stage 1010. Further, advantages obtained by separately acquiring content data 152 in two stages are not limited to the case of separating content data 152 into the first half and latter half to acquire, and can be obtained in the case of separating content data 152 into any two or more portions (i.e. part and remaining part(s) of content data 152) to acquire.

As described above, the processing as illustrated in FIG. 19 is repeated at predetermined time intervals or intervals at which mobile unit 143 moves a predetermined distance during a period of time mobile unit 143 is moving.

Accordingly, after the first half and latter half of the content data 152 are acquired, as mobile unit 143 moves inside region 146, it is determined whether or not a position (third position) of mobile unit 143 detected in stage 1101 and the content position meet a condition (third condition) that "the content position is contained in a content data display trigger region determined based on the third position" (stage 1012).

Display control section 109 makes this determination (step S703 as illustrated in FIG. 19).

Display section 114 displays the content data 152 (the first half and latter half) based on the third condition (stage 1015). In addition, when the condition (second condition) to acquire the latter half of content data 152 is not met in stage 1006 and the third condition is met in stage 1012, display section 114 displays only the first half of the content data 152.

When content data 152 is not acquired with the third condition is met in stage 1006 (exception case), display control section 109 acquires the content data 152 (stages 1013 and 1014).

When the content data 152 is displayed on display section 114, the content data 152 stored in prefetch storage section 106 is transferred to displayed first-half storage section 107 and displayed latter-half storage section 108 (stage 1016). A deletion priority assigned to the first half of the content data 152 is set at "low" at the time the first half is transferred to displayed first-half storage section 107, while a deletion priority assigned to the latter half of the content data 152 is set at "high" at the time the latter half is transferred to displayed latter-half storage section 108 (stage 1017).

The reason for storage managing section 112 to thus assign different deletion priorities to the first half and latter half of the content data 152 is that a general outline of the content data 152 can be displayed when at least first half of the content data 152 is present.

In the same way as that stages 1009 and 1010 are performed on content data 152 stored in prefetch storage section 106, stages 1009 and 1010 are performed on the first half and latter half respectively stored in displayed first-half storage section 107 and displayed latter-half storage section 108.

In other words, after display section 114 displays the content data 152, as mobile unit 143 moves inside region 146, it is determined whether or not a position (fifth position) of mobile unit 143 detected in stage 1018 and the content position meet a condition (fifth condition) that "the content position is included in a content data acquisition region determined based on the fifth position". Prefetch scheduler 104 makes this determination (step S306 as illustrated in FIG. 6).

Corresponding to a result of the determination, storage managing section 112 determines a deletion priority to assign to content data 152 (stage 1019).

Stages 1018 and 1019 are performed repeatedly until the first half of the content data 152 stored in displayed first-half storage section 107 is deleted and the latter half of the content data 152 stored in displayed latter-half storage section 108 is deleted. As a matter of course, when both the first half and latter half are deleted immediately after display section 114 displays the content data 152, stages 1018 and 1019 are not performed on the first half and latter half of the content data 152.

When the content position of content data 152 is not included in the content data acquisition region determined based on the fifth position in stage 1019, a deletion priority assigned to the content data 152 is set at "high". Thus, the content data 152 is apt to be deleted from storage section 113 faster. As a result, an advantage is obtained that it is possible to effectively use the storage capacity of storage section 113.

In addition, this advantage is obtained irrespective of whether content data 152 is separately acquired in two stages.

In the example as shown in FIG. 24, the deletion priority is determined based on the condition that "the content position is included in the content data acquisition region determined based on the fifth position". However, as described above with reference to FIG. 19, when path 144 (FIG. 1) of the mobile unit is planned in advance, a deletion priority assigned to content data 152 may be determined based on the relationship between the planned path 144 (predetermined moving path) and the content position.

For example, when the content position of content data 152 is on (or near) the predetermined moving path, a deletion priority assigned to the first half of the content data 152 is set at "low", while a deletion priority assigned to the latter half of the content data 152 is set at "high". By thus setting deletion priorities, for example, when it is known that mobile unit 143 travels back and forth on the same path, a possibility is high that content data 152 stored in moving forth is left without being deleted until the data 152 is used in moving back. It is thereby possible to enhance the usage efficiency of wireless communication path 141.

Storage managing section 112 assigns a deletion priority to data to store in storage section 113 and thus manages the data to store in storage section 113. Then, storage managing section 112 deletes the first half of content data 152 stored in displayed first-half storage section 107 and the latter half of the content data 152 stored in displayed latter-half storage section 108, based on the deletion priorities and reference time (stage 1020).

As shown in FIG. 24, prefetch scheduler 104 and display control section 109 perform the determination processing to control acquisition and display of content data 152 based on the position of mobile unit 143. Prefetch scheduler 104 and display control section 109 function as a whole as determining section 150 (FIG. 2) that performs determination processing based on the position of mobile unit 143.

In addition, FIG. 24 shows a typical example of content data 152, and there is content data 152 that exhibits behavior not shown in FIG. 24. For example, content data 152 stored in prefetch section 106 is also deleted based on the deletion priority and reference time. Further, it happens that content data 152 is displayed again after being once transferred to displayed first-half storage section 107 and displayed latter-half storage section 108.

Figure 25:
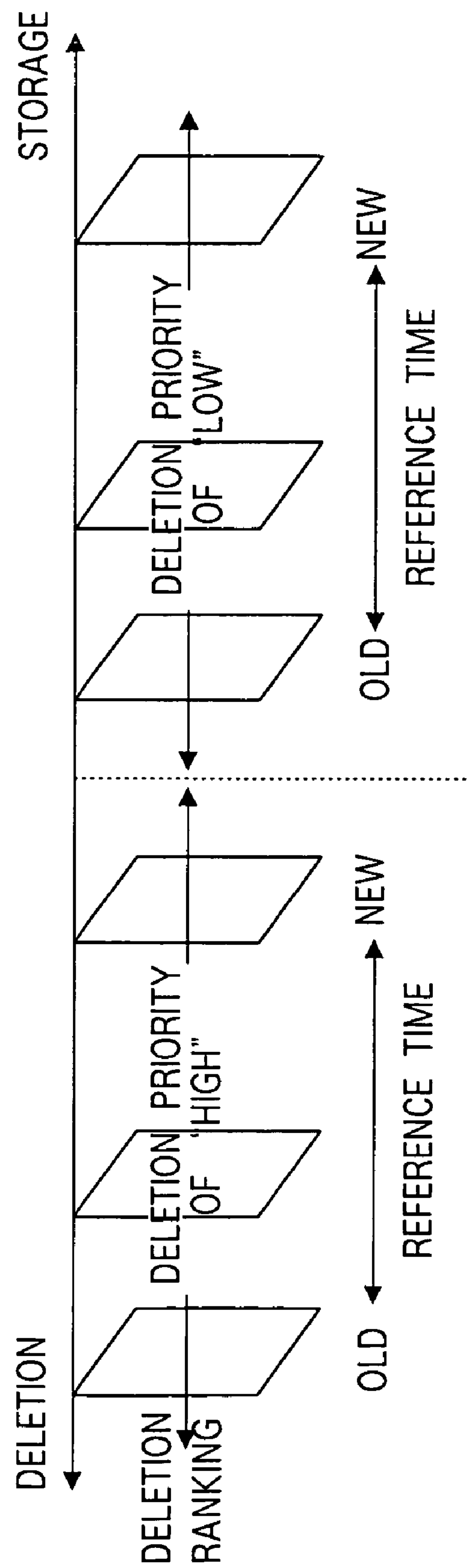
FIG. 25 is a view showing the storage managing section managing data stored in the storage section based on a deletion priority and reference time according to the above embodiment.

FIG. 25 is a view showing storage managing section 112 managing data stored in storage section 113 based on the deletion priority and reference time.

Storage managing section 112 checks a remaining capacity of storage section 113 when the section 112 receives a command (command B, C or E) to store content data 152 from prefetch section 105 or display control section 109.

When the remaining capacity is small, storage managing section 112 deletes data in descending order of deletion ranking (priority in deletion).

As shown in FIG. 25, the deletion ranking is determined on each data stored in storage section 113 (for example, the first half and latter half of content data 152), based the deletion priority ("high" or "low") and the reference time of the data. The deletion ranking of data, from the highest to the lowest, is data with the deletion priority of "high" and the oldest final reference time, data with the deletion priority of "high" with newer final reference time, data with the deletion priority of. "low" and the oldest final reference time, and data with the deletion priority of "low" with newer final reference time.

In FIG. 25, data positioned more leftward as viewed in the figure is deleted faster.

The deletion ranking is set without distinguishing between prefetch storage section 106, displayed first-half storage section 107, and displayed latter-half storage section 108 included in storage section 113.

In addition, storage section 113 does not need to be physically separated into three storage sections (prefetch storage section 106, displayed first-half storage section 107, and displayed latter-half storage section 108).

A mode for implementing three storage sections included in storage section 113 by a single storage apparatus will be described below with reference to FIG. 26. FIG. 26 is a view showing an example of a table used by storage managing section 112 to distinguish between types of data stored in storage section 113 to manage when three storage sections included in storage section 113 are implemented by a single storage apparatus.

Table 851 contains name field 852 that stores a name of a file (content data) stored in storage section 113, address field 853 that stores address (URL) of the file, type field 854 that stores a type ("prefetch" representing non-displayed, "first half" representing displayed first half, and "latter half" representing displayed latter half), remaining file field 855 that stores the presence or absence of remaining part and a file name of the part when the type is "first half "or "latter half ", reference time field 856 that stores the reference time, position filed 857 that stores a content position, and priority field 858 that stores a deletion priority.

By using table 851, storage managing section 112 is capable of recognizing specific information of files it is thus possible to implement three storage sections (prefetch storage section 106, displayed first-half storage section 107, and displayed latter-half storage section 108) included in storage section 113 by a single storage apparatus.

Figure 27:
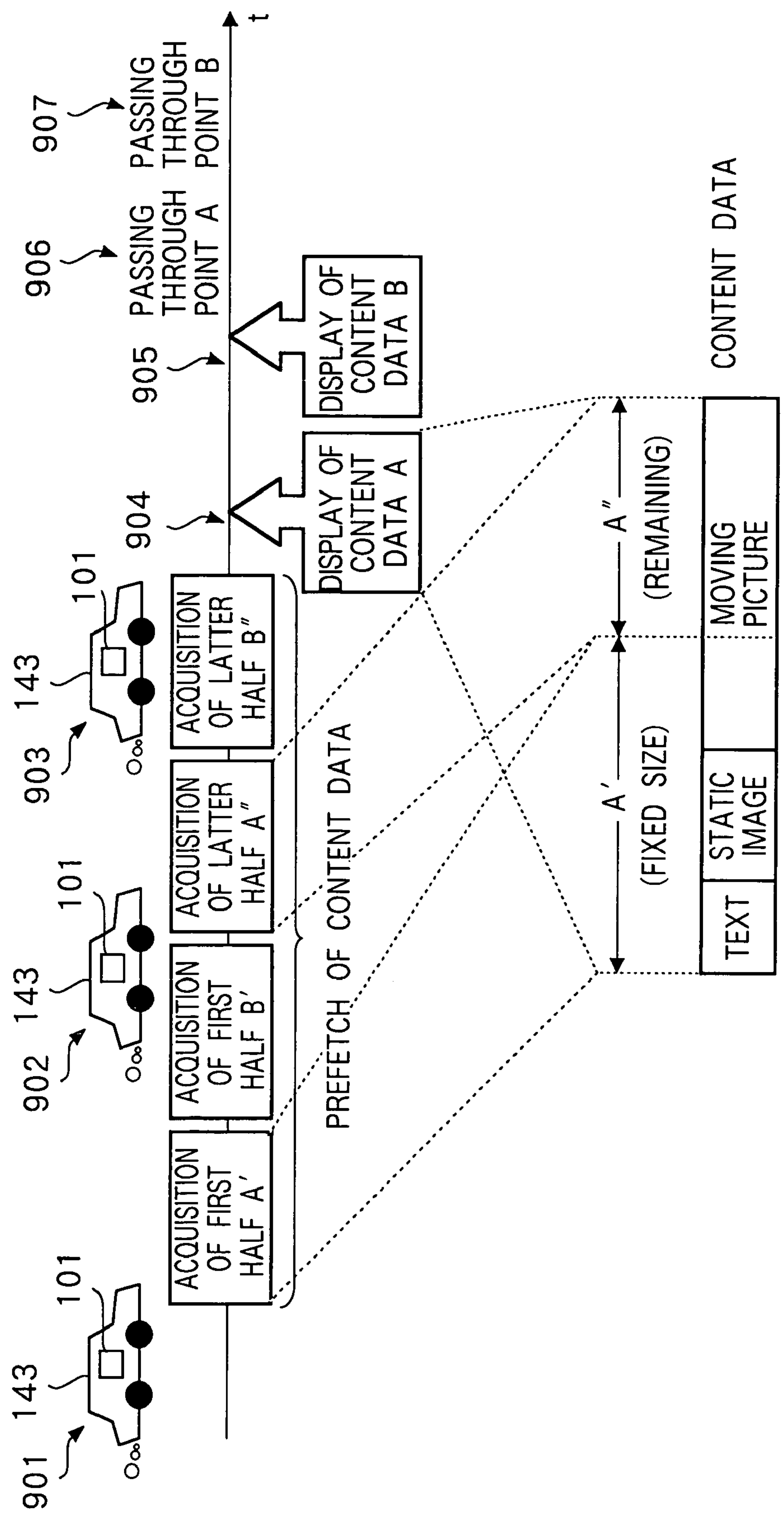
FIG. 27 is a view showing the terminal apparatus acquiring content data to enable display of the data as the mobile unit moves according to the above embodiment.

With reference to FIG. 27, a situation will be described below where terminal apparatus 101 acquires content data and enables display of the data. FIG. 27 is a view showing terminal apparatus 101 acquiring content data to enable display of the data as the mobile unit moves.

Horizontal axis "t" indicated in FIG. 27 represents passage of time. It is assumed that time passes from the left side to the right side as viewed in FIG. 27, content data A expresses content A related to A point, and that content data B expresses content B related to B point.

In FIG. 27, time 906 is the display limit time of content data A (time at which mobile unit 143 passes through A point), while time 907 is the display limit time of content data B (time at which mobile unit 143 passes through B point).

At time 901, neither content A nor content B is acquired. At time 902, the first half A' of content data A and the first half B' of content data B is acquired. At time 903, the latter half A" of content data A and the latter half B" of content data B is acquired, and it is possible to display the entire content data A (=A'+A") and entire content data B (=B'+B").

Content data A is displayed at time 904, and content data B is displayed at time 905, automatically. Time 904 is, for example, such time that the content data display trigger region starts including the content position of content data A. Time 905 is, for example, such time that the content data display trigger region starts including the content position of content data B.

Further, the content data may be displayed in response to a request from a user (for example, a driver and/or passenger of mobile unit 143) before being automatically displayed (in other words, before the content position of the content data is included in the content data display trigger region). Such a request is, for example, carried out by a user touching a content position indicated by a white circle in region 1107 (FIG. 20) on display section 114.

At time 902, when a user requests display of content A, terminal apparatus 101 is capable of displaying only the first half A' of content data A.

In the example as shown in FIG. 27, the first half A' of content data A is comprised of text, static image and moving picture. Accordingly, the text, static image and moving picture up to the middle are displayed to the user.

In addition, a structure of content data A is not limited to the structure as shown in FIG. 27. For example, content data A may be moving picture with audio. In this case, the first half A' of content data A may be text and audio, and the latter half A" of content data A may be video.

In addition, when a user that browses only the first half A' of content data A at time 902 is not interested in the content data A and determines not to need to display the latter half A", the user may enter the determination into terminal apparatus 101 not to acquire the latter half A" of content data A. It is thus possible to enhance the usage efficiency of wireless communication path 144 (FIG. 2).

At time 903, when a user requests display of content A, terminal apparatus 101 is capable of displaying the entire content data A.

Even when the terminal 101 cannot acquire the latter half A" of content data A due to a communication failure (for example, disconnection of radio signal) occurring at the position of time 902, the terminal 101 can display the first half A' of content data A at time 903.

In this way, terminal apparatus 101 of the present invention acquires the first half A' of content data A prior to the latter half A" of content data A and enables display thereof. It is thereby possible for terminal apparatus 101 to present the content expressed by the content data A as appropriate before acquiring the entire content data A. Further, by acquiring the first half A' of content data A prior to the latter half A" of content data A, terminal apparatus 101 is capable of reducing the risk that the entire content data A is not acquired due to a communication failure.

In addition, terminal apparatus 101 may acquire the latter half A" of content data A only when a user that browses only the first half A' of content data A at time 902 is interested in the content data A and designates the terminal 101 to acquire the latter half A". In this case, the browse of the latter half A" of content data A may be charged. When the browse of the latter half A" of content data A is charged, the latter half A" of content data A may be encrypted so that a user who pays the charge and acquires a decoding key is only capable of browsing the latter half A" of content data A.

In addition, encryption is not limited to only the latter half A" of content data A. It may be possible to divide content data A into arbitrary two portions and encrypt at least one of the portions. It is preferable that a portion to encrypt is an important portion (portion of commercial value) among content data A.

Whether content server 103 (FIG. 2) encrypts the latter half A" of content data A to transmit is determined based on that request 151 includes Range: designation (row 481 as shown in FIG. 13). When request 151 includes Range: designation, content server 103 encrypts the latter half A" of content data A, and transmits the encrypted data to terminal apparatus 101 with the decoding key and charge information.

In the aforementioned embodiment, whether or not to acquire content data 152 is only determined corresponding to the condition that the content position of content data 152 is included in a content data acquisition region. However, in addition to the condition, it may be possible to determine whether or not to acquire content data 152 corresponding to conditions such as the time, consecutive traveling time of mobile unit 143, weather, remaining fuel quantity of mobile unit 143, user preferences and genre of content. For example, it may be possible to acquire content data expressing content of a restaurant (for example, Japanese restaurant) according to user preferences during meal hours without acquiring the content data during hours except the meal hours.

Such acquisition is implemented by adding keyword information to content list 153 and comparing the keyword information with a database of user preferences. For example, such comparison is performed after step S306 as shown in FIG. 6.

Further, it may be possible to acquire content data expressing content of a rest place such as a service area and gas station when the consecutive travel time becomes long, or to acquire content data expressing content of indoor rest and/or entertainment facilities when it rains. Furthermore, it may be possible to acquire only content data expressing content of currently operated facilities.

Terminal apparatus 101 makes a determination on whether content data 152 meets a condition such as the time, consecutive traveling time of mobile unit 143, weather, remaining fuel quantity of mobile unit 143, user preferences and genre of content. Accordingly, a load for the search is not imposed on content server 103, and the response of content server 103 is improved. Further, the risk is eliminated that user preferences leak outside.

When path 144 (FIG. 1) of mobile unit 143 is planned in advance, path 144 (predetermined moving path) ahead of the current position (first position) of mobile unit 143 and its vicinity may be determined as a content data acquisition region.

In this case, all content data is beforehand acquired which has content positions on and around a moving path at the time the moving path is determined (for example, before mobile unit 143 starts moving). In this case, it may be possible that a moving path is determined inside terminal apparatus 101, or that a moving path is determined by another terminal which a user has or server presented by a person other than the user and the determined moving path is installed onto terminal apparatus 101 via a storage medium such as a magnetic disk or network.

Prefetch of content data prior to a start of moving of mobile unit 143 may be carried out by terminal apparatus 101 or may be carried out by another terminal or server and installed onto terminal apparatus 101 via a storage medium or server. It is thereby possible to avoid a situation where it takes a time to acquire content data during moving of mobile unit 143 and a delay occurs in displaying the content data.

Further, the above-mentioned embodiment describes dividing content data into the first half and latter half to acquire, but it may be possible to divide content data into a portion and the other portion to acquire. For example, when content data is moving picture with audio, it may be possible to first acquire only an audio portion and then acquire a moving picture portion. It is thereby possible to output only the audio when the mobile unit is far from the content position, while outputting the moving picture as well as the audio when the mobile unit approaches the content position.

As described above, according to the above-mentioned embodiment, it is possible to separately acquire content data in two stages. It is thus possible to acquire part of the content data prior to the remaining part to enable display thereof. In other words, even when a position changes largely due to the movement, it is possible to acquire appropriate content data corresponding to the position and to present the content at proper timing.

Further, according to the above-mentioned embodiment, whether to acquire the remaining part of the content data after acquiring the part of the content data is determined based on a position of the mobile unit subsequent to acquisition of the part of the content data. It is thereby possible to prevent content data the need of which is eliminated due to the movement of the mobile unit from being acquired uselessly. As a result, the transmission path can be used efficiently.

Furthermore, according to the above-mentioned embodiment, whether to acquire content data can be determined based on a position (first position) of the mobile unit. Accordingly, even when a planned path of the mobile unit is not established, it is possible to acquire content data corresponding to the position of the mobile unit.

Moreover, according to the above-mentioned embodiment, the storage managing section is capable of managing content data stored in the storage section by assigning a deletion priority to the content data stored in the storage section. The deletion priority assigned to the content data stored in the storage section is determined based on a position (fourth position) of the mobile unit detected after the acquiring section acquires the content data. In other words, it is possible to fast delete content data with information of a position far from the position of the mobile unit, i.e. content data considered as no need, and therefore, the storage capacity can be used efficiently.

In addition, it may be possible to prepare a program of the processing for terminal apparatus 101 to perform, and make a general computer execute the program to implement the processing of terminal apparatus 101.

This application is based on the Japanese Patent Application No. 2001-318672 filed on Oct. 16, 2001, entire content of which is expressly incorporated by reference herein.

INDUSTRIAL APPLICABILITY

As described above, according to the present invention, it is possible to separately acquire content data in two stages. It is thus possible to acquire part of the content data prior to the remaining part to enable display thereof. As a result, content expressed by the content data can be presented at appropriate timing.

The invention claimed is:

1. A terminal apparatus that is associated with a mobile unit and acquires content related to at least one position, comprising:

a storing section that stores a content list that stores data representing at least one position corresponding to content;

a position detector that detects a position of the mobile unit;

an acquisition region determiner that predicts at least one road on which the mobile unit will pass, based on the detected position of the mobile unit, the at least one predicted road defining a content acquisition region;

a selector that selects content corresponding to at least one position associated with the determined content acquisition region from the content list;

a prefetcher that acquires a first part of the selected content;

an acquisition determiner which determines whether a remaining part of the selected content will be referred to based on a position of the mobile unit subsequent to acquisition of the first part of the selected content, and thereby determines whether to acquire the remaining part of the selected content; and an acquiring section that acquires the remaining part of the selected content when the acquisition determiner determines to acquire the remaining part of the selected content, wherein the acquisition determiner calculates a time it will take to acquire the remaining part of the selected content, determines whether the mobile unit will be located within a predetermined distance from a position corresponding to the selected content after a period of time corresponding to the time it will take to acquire the remaining part of the selected content, and when determining that the mobile unit will be located within the predetermined distance from the position corresponding to the selected content after the period of time corresponding to the time it will take to acquire the remaining part of the selected content, determines to acquire the remaining part of the selected content.

2. The terminal apparatus according to claim 1, wherein the position detector further detects at least one of a moving speed of the mobile unit and a moving direction of the mobile unit, and the acquisition region determiner predicts the at least one road on which the mobile unit will pass based on the detected position and at least one of the detected moving speed and the detected moving direction.

3. The terminal apparatus according to claim 1, further comprising:

a presentation controller that determines whether to present the selected content based on the position of the mobile unit.

4. The terminal apparatus according to claim 3, wherein the first part of the selected content is presented, when the acquisition determiner determines not to acquire the remaining part of the selected content and the presentation controller determines to present the selected content after the prefetcher acquires the first part of the selected content.

5. The terminal apparatus according to claim 3, wherein the presentation controller determines to present the selected content when it is predicted that the mobile unit reaches a position corresponding to the selected content after moving for a predetermined time.

6. A terminal apparatus that is associated with a mobile unit and acquires content related to at least one position, comprising:

a storing section that stores a content list that stores data representing at least one position corresponding to content;

a position detector that detects a position of the mobile unit;

an acquisition region determiner that predicts at least one road on which the mobile unit will pass, based on the detected position of the mobile unit, the at least one predicted road defining a content acquisition region;

a selector that selects content corresponding to at least one position associated with the determined content acquisition region from the content list;

a prefetcher that acquires a first part of the selected content;

an acquisition determiner which determines whether a remaining part of the selected content will be referred to based on a position of the mobile unit subsequent to acquisition of the first part of the selected content, and thereby determines whether to acquire the remaining part of the selected content;

an acquiring section that acquires the remaining part of the selected content when the acquisition determiner determines to acquire the remaining part of the selected content;

a storage medium that stores the acquired first part of the selected content; and a storage manager that assigns a deletion priority to determine a priority for deleting the first part of the selected content from the storage medium, wherein the storage manager determines the deletion priority to assign to the first part of the selected content based on a determination result of the acquisition determiner.

7. The terminal apparatus according to claim 6, wherein the storage medium stores the remaining part of the selected content when the remaining part of the selected content is acquired, and the storage manger assigns different priorities to the first part of the selected content and the remaining part of the selected content after presenting the first part of the selected content and the remaining part of the selected content.

8. The terminal apparatus according to claim 1, wherein at least one of the first part of the selected content and the remaining part of the content is encrypted.

9. A terminal apparatus that is associated with a mobile unit and acquires content corresponding to a position, comprising:

a storing section that stores a content list storing data representing at least one position corresponding to the content;

a position detector that detects a position of the mobile unit;

an acquisition region determiner that predicts at least one road on which the mobile unit will pass based on the detected position of the mobile unit, the at least one predicted road defining a content acquisition region;

a selector that selects content corresponding to at least one position associated with the determined content acquisition region from the content list;

a prefetcher that acquires a first part of the selected content;

an acquisition determiner which determines whether a remaining part of the selected content will be referred to based on a position of the mobile unit subsequent to acquisition of the first part of the selected content, and thereby determines whether to acquire the remaining part of the selected content;

an acquiring section that acquires the remaining part of the selected content when the acquisition determiner determines to acquire the remaining part of the selected content;

a storage medium that stores the selected content acquired; and a storage manager that assigns a deletion priority to determine a priority for deleting the selected content from the storage medium, wherein the storage manager determines the deletion priority to assign to the selected content based on whether the position corresponding to the selected content is included in the determined content acquisition region, after the acquiring section acquires the selected content.

10. The terminal apparatus according to claim 9, wherein the storage manager determines the deletion priority to assign to the selected content based on whether the position of the selected content is included in the determined content acquisition region based on the position of the mobile unit after the selected content is presented.

11. The terminal apparatus according to claim 9, wherein the storage manager determines the deletion priority to assign to the selected content based on whether the position of the selected content is included in the determined content acquisition region based on a relationship of a predetermined moving path of the mobile unit.

12. A content distribution system, comprising:

a terminal apparatus according to claim 1;

a list server that stores the content list; and a content server that stores the content, wherein the terminal apparatus acquires the content list from the list server using a wireless communication, and further acquires the content from the content server using the wireless communication.

13. A method of acquiring content corresponding to a position of a terminal apparatus associated with a mobile unit, comprising:

storing a content list storing data representing at least one position corresponding to the content;

detecting a position of the mobile unit;

predicting at least one road on which the mobile unit will pass, based on the detected position of the mobile unit, the at least one road defining a content acquisition region;

selecting content corresponding to a position associated with the determined content acquisition region from the content list;

acquiring a first part of the selected content;

determining whether the remaining part of the selected content will be referred to based on a position subsequent to acquisition of the first part of the selected content, and thereby determining whether to acquire the remaining part of the selected content; and acquiring the remaining part of the selected content, when determining to acquire the remaining part of the selected content, wherein determining whether to acquire the remaining part of the selected content comprises:

calculating a time it will take to acquire a remaining part of the selected content;

determining whether the mobile unit will be located within a predetermined distance from a position corresponding to the selected content after a period of time corresponding to the time it will take to acquire the remaining part of the selected content; and when determining that the mobile unit will be located within the predetermined distance from the position corresponding to the selected content after the period of time corresponding to the time it will take to acquire the remaining part of the selected content, determining to acquire the remaining part of the selected content.

14. A computer-readable medium comprising a program for acquiring content corresponding to a position of a terminal apparatus associated with a mobile unit, the program comprising code for:

storing a content list storing data representing at least one position corresponding to the content;

detecting a position of the mobile unit;

predicting at least one road on which the mobile unit will pass, based on the detected position of the mobile unit, the at least one road defining a content acquisition region;

selecting content corresponding to a position associated with the determined content acquisition region from the content list;

acquiring a first part of the selected content;

determining whether the remaining part of the selected content will be referred to based on a position subsequent to acquisition of the first part of the selected content, and thereby determining whether to acquire the remaining part of the selected content; and acquiring the remaining part of the selected content, when determining to acquire the remaining part of the selected content, wherein the code for determining whether to acquire the remaining part of the selected content comprises code for:

calculating a time it will take to acquire a remaining part of the selected content;

determining whether the mobile unit will be located within a predetermined distance from a position corresponding to the selected content after a period of time corresponding to the time it will take to acquire the remaining part of the selected content; and when determining that the mobile unit will be located within the predetermined distance from the position corresponding to the selected content after the period of time corresponding to the time it will take to acquire the remaining part of the selected content, determining to acquire the remaining part of the selected content.

15. The terminal apparatus according to claim 1, wherein the content includes video and audio.

16. The terminal apparatus according to claim 15, wherein the prefetcher acquires an audio portion of the content, while the acquiring section acquires a video portion of the content.

17. The terminal apparatus according to claim 9, wherein the storage medium assigns different deletion priorities to the first part of the selected content and the remaining part of the selected content.

* * * * *